(12) United States Patent
Oliver Gomila et al.

(10) Patent No.: US 11,774,255 B2
(45) Date of Patent: Oct. 3, 2023

(54) METHODS AND SYSTEMS FOR CONVERSION OF PHYSICAL MOVEMENTS TO CARBON UNITS

(71) Applicant: Greenlines Technology Inc., Vancouver (CA)

(72) Inventors: David Oliver Gomila, Vancouver (CA); Arturo Miguel Garcia, Vancouver (CA); Svend Andersen, Vancouver (CA)

(73) Assignee: Greenlines Technology Inc., Vancouver (CA)

( * ) Notice: Subject to any disclaimer, the term of this patent is extended or adjusted under 35 U.S.C. 154(b) by 906 days.

(21) Appl. No.: 16/295,832

(22) Filed: Mar. 7, 2019

(65) Prior Publication Data

US 2020/0284600 A1 Sep. 10, 2020

(51) Int. Cl.
*G01C 21/34* (2006.01)
*G06Q 30/018* (2023.01)
*G06Q 10/083* (2023.01)

(52) U.S. Cl.
CPC ....... *G01C 21/3469* (2013.01); *G06Q 30/018* (2013.01); *G06Q 10/083* (2013.01)

(58) Field of Classification Search
None
See application file for complete search history.

(56) References Cited

U.S. PATENT DOCUMENTS 7,343,341 B2 3/2008 Sandor et al.
8,346,595 B2 1/2013 Ben-Hamida et al.
(Continued)

FOREIGN PATENT DOCUMENTS

CA 2825809 A1 2/2014
CA 2853638 12/2015
(Continued)

OTHER PUBLICATIONS

Ritter, Karin, Miriam Lev-On, and Terri Shires. "Understanding uncertainty in greenhouse gas emission estimates: technical considerations and statistical calculation methods." 19th Annual International Emission Inventory Conference. 2010.*

(Continued)

*Primary Examiner* — Peter Ludwig
*Assistant Examiner* — Donald J Edmonds
(74) *Attorney, Agent, or Firm* — McCarthy Tétrault LLP

(57) ABSTRACT

Methods and systems are provided for producing tradeable environmental attributes such as carbon offsets from the physical movements of users. The solution incorporates the use of a modal shift optimization application executed on a user's device. The application locates alternative transport options, and monitors the user's physical movements as the user travels to the destination using one of the alternative transport options. A carbon offset system receives the user's trip data and calculates project greenhouse gas (GHG) emissions for the user's journey. The carbon offset system also calculates baseline GHG emissions for a baseline transport option (e.g. single-occupancy private vehicle trip), based at least in part on the baseline emissions factor and a discount factor. The carbon offset system extracts the GHG emissions savings by determining a difference between the baseline and project emissions, which can be validated and verified for the production of carbon offsets.

21 Claims, 17 Drawing Sheets

(56) References Cited

U.S. PATENT DOCUMENTS

| | | | |
|---|---|---|---|
| 8,478,566 B2 | 7/2013 | Glenn et al. | |
| 8,498,818 B1* | 7/2013 | Jones, Jr. | G06Q 10/10 702/1 |
| 2008/0015975 A1 | 1/2008 | Ivchenko et al. | |
| 2009/0210295 A1 | 8/2009 | Edholm et al. | |
| 2009/0292617 A1 | 11/2009 | Sperling et al. | |
| 2010/0030608 A1* | 2/2010 | Kaminsky | G06Q 50/06 705/335 |
| 2010/0161455 A1* | 6/2010 | Robinson | G06Q 30/00 705/30 |
| 2010/0217535 A1* | 8/2010 | Seidel | G06Q 50/06 73/23.31 |
| 2010/0250356 A1 | 9/2010 | Gillenson et al. | |
| 2010/0280853 A1* | 11/2010 | Petralia | G06Q 10/02 705/5 |
| 2011/0022404 A1* | 1/2011 | Peterson | G06Q 30/06 705/1.1 |
| 2011/0145438 A1 | 6/2011 | Sakamoto | |
| 2011/0184784 A1* | 7/2011 | Rudow | G06Q 10/0639 701/29.6 |
| 2012/0172017 A1 | 7/2012 | Ratti et al. | |
| 2012/0173293 A1* | 7/2012 | Motley | G06Q 10/06 705/7.11 |
| 2013/0117061 A1* | 5/2013 | Ben-Hamida | G06Q 30/0283 705/7.22 |
| 2013/0218446 A1* | 8/2013 | Bradley | B60K 15/04 701/123 |
| 2014/0303935 A1 | 10/2014 | Kamel et al. | |
| 2015/0127391 A1* | 5/2015 | Bellowe | G06Q 50/01 705/5 |
| 2017/0275335 A1 | 9/2017 | Bunio et al. | |
| 2017/0351978 A1* | 12/2017 | Bellowe | G06Q 50/01 |
| 2018/0012233 A1* | 1/2018 | Steigler | G06Q 50/28 |

FOREIGN PATENT DOCUMENTS

| | | |
|---|---|---|
| CN | 105354786 | 2/2016 |
| DE | 102011051250 | 4/2013 |
| JP | 5187323 | 4/2013 |

OTHER PUBLICATIONS

DynaCERT Announces Proprietary Greenhouse Gas Tracking https://globenewswire.com/news-release/2017/10/05/1141370/0/en/dynaCERT-Announces-Proprietary-Greenhouse-Gas-Tracking-System.html.

Schipper et al. "Transport and Carbon Dioxide Emissions: Forecasts, Options Analysis, and Evaluation" ADB Sustainable Development Working Paper Series, No. 9, Dec. 2009.

Project Design Document Form (Version 10.1) "DiDi online ride-hailing service emission reduction project in Dongguan City", https://cdm.unfccc.int/methodologies/SSCmethodologies/pnm/byref/SSC-NM102, Aug. 3, 2018.

Proposed new small scale baseline and monitoring methodology form (Version 01.0) "Greenhouse gas emission reduction methodology for online ride-hailing service", https://cdm.unfccc.int/methodologies/SSCmethodologies/pnm/byref/SSC-NM102, Aug. 3, 2018.

Neves Andre et al., Assessing the potential for carbon emissions savings from replacing short car trips with walking and cycling using a mixed GPS-travel diary approach, Transportation Research Part A: Policy and Practice, Aug. 31, 2018, pp. 130-146, vol. 123, ISSN: 0965-8564, DOI:10.1016/J.TRA.2018.08.022, Elsevier Ltd., Pergamon, Amsterdam, NL.

* cited by examiner

Emission Factors
(g CO2e/pkm)

| Jurisdiction | Region 1 | Region 2 | Region 3 | Region 4 | Region 5 | Region 6 | Region 7 | Region 8 | Region 9 |
|---|---|---|---|---|---|---|---|---|---|
| Reference | CAS | NRCan, NIR | NRCan, NIR | NRCan, NIR | EPA | EPA | EPA | EPA | EPA |
| Mode of Transport | | | | | | | | | |
| Walk | 0.0 | 0.0 | 0.0 | 0.0 | 0.0 | 0.0 | 0.0 | 0.0 | 0.0 |
| Bike | 0.0 | 0.0 | 0.0 | 0.0 | 0.0 | 0.0 | 0.0 | 0.0 | 0.0 |
| Bikeshare | 0.0 | 0.0 | 0.0 | 0.0 | 0.0 | 0.0 | 0.0 | 0.0 | 0.0 |
| Bus (City) | 80.2 | 100.1 | 80.5 | 110.8 | 115.3 | 112.1 | 113.1 | 113.1 | 32 |
| Transit Rail Within City | 5.3 | 10.5 | 0.8 | 205.7 | 133.2 | 128.3 | 202.2 | 128.4 | NA |
| Commuter Rail | 5.6 | 9.2 | 0.8 | 214.6 | 123.5 | 133.3 | 201.5 | 135.4 | NA |
| Intercity Rail | 125 | 130.5 | 120.2 | 120.2 | 120.2 | 120.2 | 120.2 | 120.2 | 91 |
| Ferry (City) | 144.7 | 134.4 | 162.3 | 162.3 | 162.3 | 162.3 | 162.3 | 162.3 | 145.0 |
| Ferry (Intercity) | 155 | 143.2 | 143.2 | 143.2 | 141.5 | 138.2 | 142.5 | 143.2 | 118.2 |
| Taxi (Hybrid) | 165 | 156.9 | 162.2 | 162.2 | 162.2 | 159.2 | 164.2 | 155.6 | 150.5 |
| Carshare (Compact car) | 210.7 | 210.8 | 219.2 | 219.2 | 212.2 | 210.2 | 209.5 | 220.2 | 212.5 |
| TNC (Average car) | 234.8 | 233.8 | 232.2 | 234.2 | 234.2 | 245.2 | 233.2 | 234.2 | 232.5 |
| Cable car | 1.5 | 7.0 | 0.9 | 88 | 69.8 | 86.8 | 54.3 | 63.8 | 67.5 |
| E-bikes | 0.7 | 0.7 | 0.25 | 12.8 | 2.7 | 1.9 | 15.9 | 8.9 | 12.8 |
| E-scooters | 1.1 | 2.7 | 0.7 | 22.9 | 2.8 | 1.9 | 23.8 | 9.8 | 14.8 |
| E-Motorcycle/Vetrix | 2.3 | 6.4 | 0.7 | 56.2 | 35.4 | 15.4 | 75.4 | 23.4 | 43.3 |
| Motorcycle (gasoline) | 128.3 | 133.3 | 133.3 | 129.3 | 131.3 | 121.3 | 144.3 | 133.3 | 123.8 |
| Car - electric vehicle | 6.0 | 6.0 | 0.7 | 198.0 | 150.0 | 134.0 | 134.0 | 145.0 | 142.1 |
| Car - hybrid | 165 | 156.9 | 162.2 | 162.2 | 162.2 | 162.2 | 162.2 | 162.2 | 150.5 |
| Car - compact (gasoline) | 210.7 | 210.8 | 219.2 | 219.2 | 212.2 | 210.2 | 209.5 | 220.2 | 212.5 |
| Car - Average (gasoline) | 234.8 | 233.8 | 232.2 | 234.2 | 234.2 | 245.2 | 233.2 | 234.2 | 232.5 |
| Car, Light Truck (diesel), SUV & Minivan | 299.5 | 294.1 | 294.1 | 294.1 | 294.1 | 294.9 | 288.1 | 291.3 | 290.9 |

*FIG. 13A*

Modal ratio values

| Mode of Transport | MoR Region 1 | MoR Region 2 | MoR Region 3 | MoR Region 4 | MoR Region 5 | MoR Region 6 | MoR Region 7 | MoR Region 8 | MoR Region 9 |
|---|---|---|---|---|---|---|---|---|---|
| Reference | Statistics Canada Census 2016 | Statistics Canada Census 2016 | Statistics Canada Census 2016 | Statistics Canada Census 2016 | BTS US Census 2016 | BTS US Census 2016 | BTS US Census 2016 | BTS US Census 2016 | BTS US Census 2016 |
| Private Car Use | 71.8% | 76.3% | 79.8% | 76.3% | 79.3% | 77.5% | 79.6% | 72.9% | 69.9% |

*FIG. 13B*

METHODS AND SYSTEMS FOR CONVERSION OF PHYSICAL MOVEMENTS TO CARBON UNITS

TECHNICAL FIELD

This present disclosure relates generally to technology for implementing carbon offset programs, including methods and systems for recognizing environmental attributes from emission reduction activities, and quantifying and producing verifiable carbon offsets.

BACKGROUND

The earth's so-called "greenhouse effect" describes the process by which radiatively active greenhouse gases (GHGs) in the planet's atmosphere, such as water vapor, carbon dioxide, methane, nitrous oxide and ozone, contribute to the downward radiation which warms the planet's surface. Increased GHG emissions, driven in large part by human activity, has strengthened the greenhouse effect and contributed to global climate change, threatening ecosystems, biodiversity, economies and human livelihood. Climate change poses one of the greatest risks to survival of the human species. Leading climate scientists have warned that there are only about a dozen years for global warming to be kept to a maximum of 1.5° C., beyond which even half a degree will significantly worsen the risks of drought, floods, extreme heat and poverty for hundreds of millions of people. One of the largest sources of GHG pollution in North America and around the world is the transportation sector (i.e. transport of people and goods, via cars, trucks, planes, trains and other means). In 2015, the transportation sector was the second largest source of GHG emissions in Canada, accounting for 24% (173 metric tonnes of carbon dioxide or its equivalent ($CO_{2e}$)) of total national emissions. Emissions from passenger and freight travel amounted to 96% of these emissions, or 91 metric tonnes of $CO_{2e}$ and 76 metric tonnes of $CO_{2e}$ of transportation emissions, respectively. Between 1990 and 2015, GHG emissions from the transportation sector grew by 42% (Source: Environment and Climate Change Canada). As of 2016, the transportation sector produced 28.5% of total GHG emissions in United States, and is the largest source of GHG emissions in the United States (Source: United States Environmental Protection Agency). In the United States, goods carried by roads amount to 1.929 trillion metric ton-kilometers per year which is the second highest in the world, based on 2009 estimates, and road passengers amount to 6.798 trillion person kilometers per year, the highest in the world, based on 2011 estimates (Source: United States Department of Transportation, Federal Highway Administration). In 2017, there were 2,431,558,000,000 VMT (Vehicle Miles Travelled) in the United States (Source: National Household Travel Survey, Federal Highway Administration).

In an effort to limit or reduce GHG emissions, carbon offset projects (also referred to as carbon reduction programs) have been implemented to formally recognize emission reductions in the form of carbon offsets. Each carbon offset represents a reduction in emissions of carbon dioxide or its equivalent ($CO_{2e}$), typically denominated in metric tons of $CO_{2e}$. A party which produces GHG emissions can offset its emissions by purchasing carbon offsets from another party which has achieved GHG reductions through certain activities. In certain cases, to comply with various regulatory obligations, an entity that exceeds its GHG limits can purchase carbon offsets (i.e. a reduction in emissions of carbon dioxide or GHG) to offset its excess emissions and bring it into compliance. Even where there is no regulatory requirement, an entity can voluntarily purchase carbon offsets to offset its GHG emissions. The sale of carbon offsets is typically used to fund activities that reduce GHGs, such as renewable energy projects (e.g. wind farms, hydroelectric dams, biomass energy) and energy efficiency projects.

Criteria for evaluating the use of a carbon offset project include the concepts of "additionality" and a "baseline". "Additionality" evaluates whether the GHG emission reductions achieved by an activity is additional to what would have happened if the activity had not been implemented because of the carbon offset project (i.e. the emission reduction activity is beyond business-as-usual and would not have occurred if the activity was not carried out through the carbon offset project). Additionality is generally determined with reference to a "baseline", which can be described as the reference scenario that is characterized by the absence of the specific policy initiative that enabled the proposed activity in connection with the carbon offset project, holding all other factors constant. In the transportation sector, technical, financial and other implementation barriers have hindered the development of technologies that can be used to establish additionality for a carbon offset program for the physical movement of people and goods. Existing solutions for reducing GHG emissions in the transportation sector have been largely unable to demonstrate the additionality criteria as the solutions typically cover only a single mode of transport (e.g. bus rapid transit), do not account for the first or last mile or segment of a user's trip, require significant capital investment by local governments, and do not factor in alternative modes of transport or data from individual users. There is a need for solutions that incentivize more environmentally-sustainable transportation choices and can be used as part of an overall technological framework to support projects that reduce or offset GHG emissions in the transportation sector.

SUMMARY OF THE DISCLOSURE

The present specification relates to methods and systems for the conversion of the physical movement of people or goods to quantifiable and verifiable emission reductions. These emission reductions can be recognized as environmental attributes in the form of carbon offsets or credits.

One aspect of the invention provides a method of producing verifiable environmental attributes. The method includes: (a) receiving from a user an input specifying a destination, and determining a plurality of transport options to the destination from a current location of the user, the current location defining a start point for a trip, and wherein each of the transport options comprises one or more modes of transport; (b) monitoring movements of the user as the user completes the trip by travelling to the destination, wherein monitoring the movements comprises tracking a distance travelled for each mode of transport taken by the user; (c) calculating project GHG emissions for the trip, based at least in part on the emissions factor associated with each mode of transport and the distance travelled for each mode of transport; (d) calculating baseline GHG emissions for a baseline transport option to the destination, based at least in part on the emissions factor for the baseline trip and a discount factor indicative of the likelihood of adoption of the baseline transport option; and (e) extracting the GHG emissions savings by determining a difference between the baseline GHG emissions and the project GHG emissions.

The difference can be communicated to a system for aggregation with GHG emissions savings from other trips. The aggregated GHG emissions savings are delivered to an independent system for validation and verification. Using a recognized conversion methodology, the aggregated GHG emissions savings can be converted into environmental attributes such as carbon units, carbon offsets and carbon credits.

In certain embodiments, calculating the project GHG emissions can be additionally based on server emissions produced by energy consumption of one or more servers used for determining the plurality of transport options and monitoring the movements of the user for the trip. Calculating project GHG emissions for the trip can involve summing emissions from a plurality of segments of the trip each of which is taken in a particular mode of transport and has an associated emissions factor.

In particular embodiments, the discount factor applied to determine baseline emissions is specific to a geographic region containing the start point.

Determining the plurality of transport options may include, for at least a portion of the trip, selecting from modes of transport having reduced GHG emissions over the baseline transport option.

In some embodiments, the user is tasked with transporting a good from a predefined location to a location of a customer. In such case, where the good is initially located elsewhere, at a predefined location (i.e. not at the same location as the user), steps (a) to (e) of the above method are performed for a first trip taken by the user to pick up the good from the predefined location and for a second trip taken by the user to deliver the good from the predefined location to the location of the customer.

Another aspect of the invention relates to a system of producing verifiable environmental attributes. The system has an environmental impact server configured to: (a) receive from a user device an input specifying a destination, and determine a plurality of transport options to the destination from a current location of the user device, the current location defining a start point for a trip, and wherein each of the transport options comprises one or more modes of transport; (b) monitor movements of the user as the user completes the trip by travelling to the destination, wherein monitoring the movements comprises receiving geolocation information from the user device tracking a distance travelled for each mode of transport taken by the user; (c) calculate project GHG emissions for the trip, based at least in part on the emissions factor associated with each mode of transport and the distance travelled for each mode of transport; (d) calculate baseline GHG emissions for a baseline transport option to the destination, based at least in part on the emissions factor for the baseline trip and a discount factor indicative of the likelihood of adoption of the baseline transport option; and (e) extract the GHG emissions savings by determining a difference between the baseline GHG emissions and the project GHG emissions. The difference is communicated by the environmental impact server to a system for aggregation with GHG emissions savings from other trips. The aggregated GHG emissions savings can be delivered to an independent system for validation and verification.

Additional aspects of the invention will be apparent in view of the description which follows.

BRIEF DESCRIPTION OF THE DRAWINGS

Features and advantages of the embodiments of the present invention will become apparent from the following detailed description, taken in with reference to the appended drawings in which:

FIG. 13A is an exemplary table of region-specific emission factors for various modes of transport;

FIG. 13B is an exemplary table of modal ratio values for various geographic regions;

DETAILED DESCRIPTION

Figure 1:
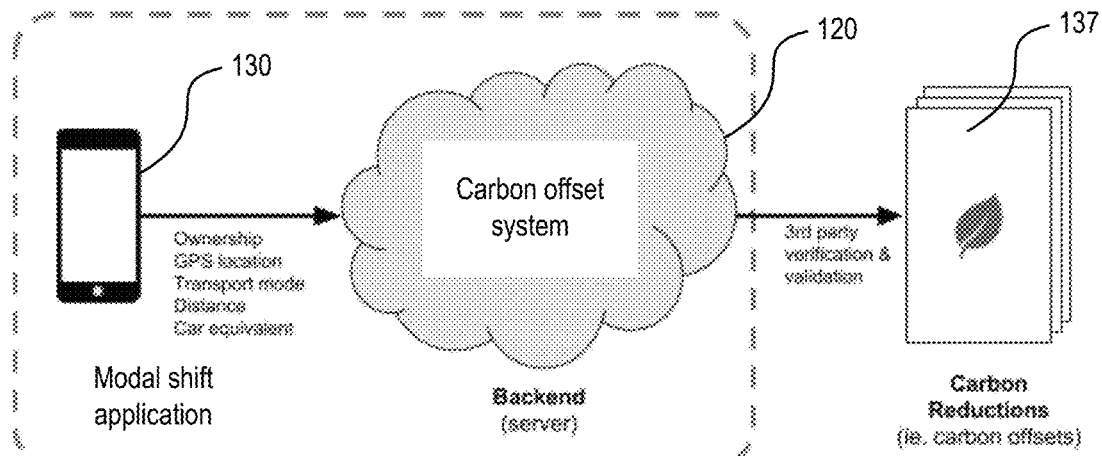
FIG. 1 provides a schematic overview of a carbon offset system.

The description which follows, and the embodiments described therein, are provided by way of illustration of examples of particular embodiments of the principles of the present invention. These examples are provided for the purposes of explanation, and not limitation, of those principles and of the invention.

The present invention provides apparatus, systems and methods for quantifying greenhouse gas (GHG) emissions and emissions savings in the transportation sector. Such emissions savings can be transformed into verifiable environmental attributes such as carbon offsets. Particular embodiments overcome various technical and other implementation barriers to support the ownership and additionality of a carbon offset program in the transportation sector, and provide an end-to-end process to enable the quantification of GHG emissions data from an individual's physical movements in cities (over land and water transport, for example) and the conversion of the physical movement of people to quantifiable emission reductions, which can be recognized as environmental attributes in the form of carbon offsets or credits. The GHG emissions data (including net GHG emissions savings) can be validated and verified so as to be certified as verified carbon units (VCUs). The VCUs are recorded in a registry for transacting in carbon markets. Embodiments described herein can also be applied to support carbon offset programs for the physical movement of goods, including the transport and delivery of goods.

Throughout this specification, numerous terms and expressions are used in accordance with their ordinary meanings. Provided immediately below are definitions of some terms and expressions that are used in the description that follows. Definitions of some additional terms and expressions that are used are provided elsewhere in the description.

"Mode of transport" refers to any mode of transport that can be used to move a person or good from point A to point B, whether over land, water or air. Mode of transport includes human-powered transport, such as walking or running, and forms of human-powered transport that are enhanced with a human-powered vehicle, such as bicycling, skateboarding, scootering, inline-skating and the like. Mode of transport includes transport by land-based vehicles and land-based transportation systems, including, for example, gas-powered automobiles, bus, transit rail, commuter rail, intercity rail, ride-hailing, taxi (e.g. hybrid or electric taxi), ride-share, car-share, cable car, plug-in electric vehicle, multiple passenger vehicle, vehicle with start-stop system, electric scooter, electric bicycle and the like, and various modes of watercraft transport (e.g. ferries) and remote-controlled vehicles, including delivery by drone (as defined below).

"Environmental attributes" refers to all interests or rights arising from characteristics relating to the environmental impacts associated with an activity, and which include quantifiable, marketable and verifiable environmental attributes, such as GHG reductions in the form of carbon offsets or credits. Carbon offsets or credits are considered an environmental benefit, given that they are derived from some reduction in GHG emissions for a particular activity as compared to the GHG emissions for the equivalent baseline activity. In embodiments described herein, the baseline activity includes taking a Single-Occupancy Baseline Trip, as defined below, or other baseline trip (e.g. delivery van or truck), while the activity that produces emissions savings includes taking at least one alternative mode of transport such as walking, bicycle-share, bus, transit rail, commuter rail, intercity rail, ferry, ride-hailing, taxi (e.g. hybrid or electric taxi), ride-share, car-share, cable car, plug-in electric vehicle, multiple passenger vehicle, vehicle with start-stop system, electric scooter, electric bicycle and the like, for all or at least a portion of the trip. Any transport option which produces less GHG emissions than the baseline trip can be considered an activity that produces GHG emissions savings which can be converted to quantifiable and verifiable emission reductions. Such activity does not require that an alternative mode of transport be used for the entirety of the trip. For example, a transport option which includes a portion of the trip being taken by single-occupancy vehicle to reach a bus stop or transit rail station, with the remainder being taken by bus or transit rail and/or walking, would be considered a transport option or activity that produces a modal shift and results in emissions savings over the baseline trip.

"Fossil Fuel Vehicle" (FFV) is a vehicle that relies on fossil fuel as a fuel source (e.g. vehicles powered by gasoline, diesel, ethanol-gasoline mixed or compressed natural gas). Hybrid vehicles using fossil fuel as the single fuel source with regenerative braking to charge the battery are also included in this definition.

"Modal shift optimization application" (also referred to herein as a "modal shift application") includes any technology solution that allows a user to find a route between two points in real-time, using one or more modes of transport which result in a reduction of emissions as compared to an equivalent baseline trip, such as the Single-Occupancy Baseline Trip (as defined below). In particular embodiments, the modal shift application is a mobile application that runs on a user's device to assist the user with trip planning and enables the user's movements to be tracked for conversion to carbon offsets in accordance with the embodiments described herein.

"Listed User" (LU) is a user who has downloaded and installed the modal shift application onto their user device and has accepted the terms of use. The modal shift application causes such users to be listed in a system ledger maintained by a carbon offset system. Each Listed User is uniquely identified by a system-generated identifier specific to the user's device instance. Unless otherwise specified, a "user" refers to a Listed User.

"Single-Occupancy Baseline Trip" (SOBT) is a single-occupancy vehicle trip, used as the baseline for the purpose of assessing GHG emissions savings in some situations (e.g. where the single-occupancy vehicle trip is "common practice" as explained below). "Single-Occupancy Baseline Trip Distance" is the distance of the SOBT that a listed user would have taken in the baseline scenario. The distance of such trip is calculated for the shortest trip (in terms of time and/or distance) for an equivalent single-occupancy vehicle trip between the start point and end point (destination) of the user's trip. SOBT refers to a trip made by a FFV, as opposed to a PEV (as defined below). Trips made by PEVs can produce an environmental benefit in GHG emission savings as compared to trips made by FFVs.

"Discount factor" is an indication of the likelihood that a trip taken in a specific geographic region (or jurisdiction) is a baseline trip. In certain embodiments, the discount factor is a modal ratio (MoR), also referred to as a "mode ratio". In situations where the baseline is a single-occupancy vehicle trip, MoR can be expressed as a percentage of the total trips that are taken with single-occupancy vehicle as the mode of transport. In particular embodiments, the MoR is applied to discount the baseline emissions to account for the likelihood of a trip being taken as a baseline trip.

"Plug-in Electric Vehicle" (PEV) is a vehicle that runs on electric energy stored in on-board batteries and has no other source of external energy to propel the vehicle. Batteries are charged using electricity from the grid.

"Project trip" refers to an actual trip completed under the carbon offset program and "project geographic area" refers to the pre-defined geographic area for which the data used for determining GHG emissions savings is valid. In some cases, the project geographic area contains one or more urban agglomerations. For the systems and methods described herein, it is assumed that the project trip starts in or takes place entirely within the boundary of a pre-defined geographic area (i.e. within a "project boundary").

FIG. 1 provides a schematic overview of a carbon offset system 120 according to one embodiment of the invention. Carbon offset system 120 is a system that is capable of producing environmental benefits such as carbon offsets from the tracking of physical movements of people. In other embodiments carbon system 120 can also be used to track movements of couriers and/or delivery drones (as described elsewhere herein). The quantification and production of carbon offsets from the transport of people is achieved through enabling users to plan their trips with a user device 130 that is in communication with the carbon offset system 120. User device 130 may comprise any portable device that is capable of connecting to a mobile network, including, without limitation, smart phones, mobile devices, smart watches, hardware installed in a transport vehicle such as a private vehicle (e.g. auto-stop vehicle) or installed in the vehicle's infotainment system, GPS (Global Positioning System) devices, activity tracking devices, and the like. A modal shift application is loaded on each user's device 130. (In alternate embodiments, equivalent functionality of the modal shift application may be built into the operating system or hardware of the device.) The modal shift application incorporates trip planning functionality and supports and enables modal shift in urban agglomerations. Modal shift refers to the shifting of people away from private vehicles (which is currently the dominant form of travel in many geographic regions, including in North America) or from other baseline transport options, into any sustainable form of transport that results in a reduction of GHG emissions, such as public transit, bicycles, bicycle-shares, ride-hailing, taxis, ferries, car-shares, and any more efficient use of private vehicles resulting in a reduction of GHG emissions, such as use of PEVs, auto-stop vehicles, park and ride, carpooling in private vehicles, etc. The carbon offset system 120 aggregates trip planning information from the servers of public and private transportation providers (or from a server managed by carbon offset system 120, in the case of a transport company using their own services (e.g. taxis, ride-sharing, bicycle-sharing) to provide users with different options without integrating other transport providers), and provides that information to the user's device 130 via the modal shift application, enabling users to plan their trips using alternative modes of transport, which are alternative to the baseline (e.g. a single-occupancy private vehicle trip).

After the user completes their trip, the carbon offset system 120 calculates the GHG emissions for the completed trip as well as for the equivalent baseline trip (wherein a pre-defined discount factor or MoR is applied to the baseline emissions to account for the likelihood of a user utilizing a baseline transport option in that geographic region), and calculates a difference in the emissions. The resulting GHG emission savings across all user trips are aggregated by the carbon offset system and converted to quantifiable emission reductions, which can be validated and verified for the purpose of having them being recognized as carbon units, depicted as VCUs 137 in FIG. 1. The conversion of the physical movements (transport) of users to GHG emissions savings data and carbon offsets is performed in accordance with a modal shift process or methodology and project plan as described in more detail herein.

Figure 2:
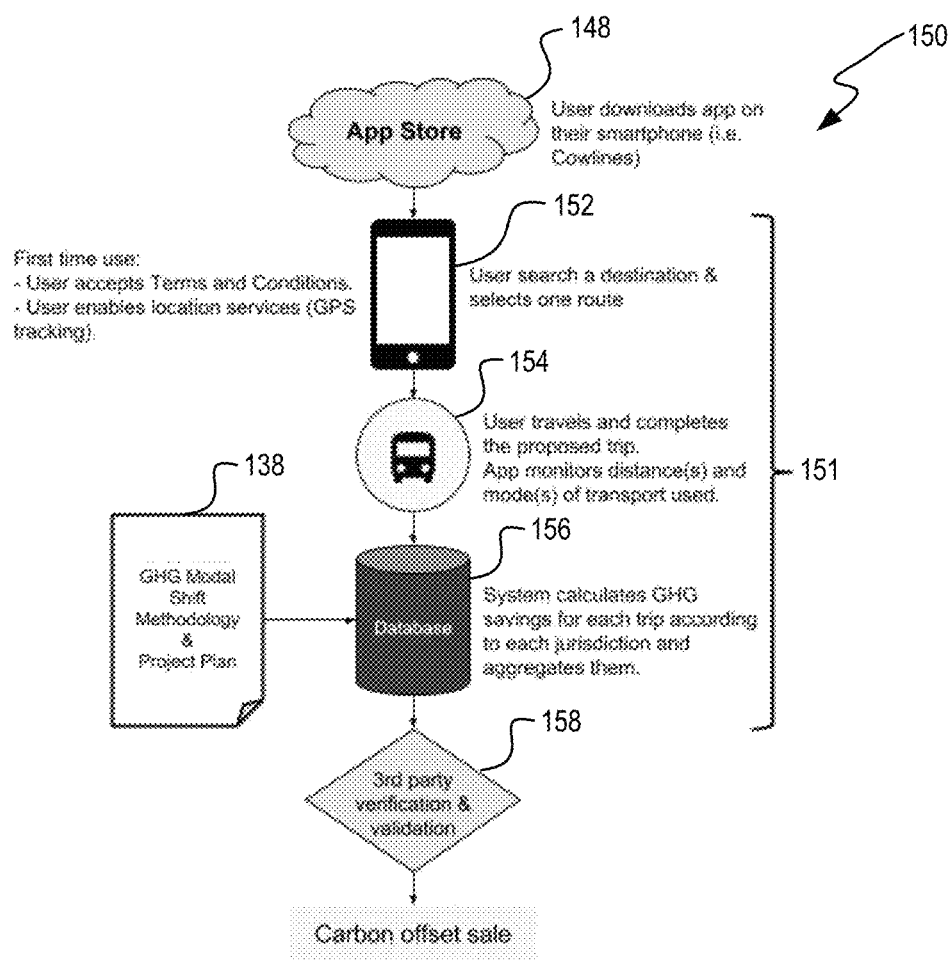
FIG. 2 is a flowchart of a method of quantifying GHG emissions data from an individual's physical movements for conversion to verifiable and tradeable environmental attributes.

FIG. 2 illustrates a flowchart of a method 150 of quantifying GHG emissions data from an individual's physical movements for conversion to verifiable and tradeable environmental attributes, in accordance with one embodiment of the invention. Method 150 begins at block 148 with a non-listed user downloading and installing on the user's device the modal shift application as described herein. Prior to initial use of the modal shift application, the non-listed user is required to accept the terms of use (which will require the user to consent to transferring ownership of environmental attributes, as explained in more detail below with reference to FIG. 4) and enable geolocation services (e.g. Global Positioning System (GPS) tracking). Method 150 then proceeds to block 152 where the user requests trip plans by inputting a destination (through interaction with a user interface, voice, touch, and the like), receives the available trip plans to the input destination (which are alternatives to a baseline trip), and selects from the available trip plans. The user then travels and completes the selected trip at block 154. Meanwhile, as the user is travelling, the modal shift application monitors the distance travelled for each mode of transport, by way of the geolocation services enabled on the user's device.

Once the user has arrived at their destination (i.e. the trip is complete), method 150 proceeds to block 156 at which the carbon offset system calculates GHG savings for the completed trip. These calculations are based on a modal shift methodology and project plan 138 according to the geographic region, as explained in more detail herein, and are performed for each trip taken by a user. The net GHG emissions savings can be calculated as follows: Net GHG emissions savings=Baseline emissions (as determined using the distance for a baseline trip and GHG modal shift methodology)−Project emissions (as determined using trip data from the completed trip and GHG modal shift methodology)−Leakage (e.g. accounting for a tendency for the user to take their trip outside the defined geographic region for the project). For particular embodiments, leakage is not considered a significant issue for the project and is assumed to be zero, particularly because it is unlikely that users would move their trip outside the project boundary due to an increase in modal shift within the project boundary. Net GHG emissions savings for all of the trips taken by users who are using the modal shift application are aggregated by the carbon offset system, and are provided to a third party for validation and verification at block 158, resulting in certified carbon offsets for sale or exchange in the carbon offsets market.

The steps at blocks 152, 154, and 156 of FIG. 2 are part of a method 151 which can be performed at least in part by a carbon offset system, in accordance with embodiments of the invention described herein, communicating with user devices executing instructions provided in the modal shift application. The carbon offset system comprises an environmental impact server. The environmental impact server obtains trip planning data from a trip search server and communicates with the user devices over a wireless communication network. The environmental impact server may be provided through one or more machines on a network which are capable of accepting requests from the user devices (e.g. such as trip search requests) and geolocation/trip data from the user devices, and communicating with one or more trip search servers to obtain the trip planning data or transport options for the user's trip search requests. The environmental impact server may comprise a computer, computer program, data center, machine or device which manages access to a centralized resource or service in a network.

Available transportation providers and modes of travel in the project geographic region can be integrated into the modal shift application. The modal shift application supports travel between a start point (e.g. the user's current location at the time of the user's request for trip plans) and an end point (destination). In particular scenarios, both the start point and end point are located within the same geographic region or project boundary. However, this is not always the case. Some embodiments of the modal shift application support travel between urban agglomerations or locations in different geographic regions or outside a project boundary, as explained elsewhere herein.

Figure 3:
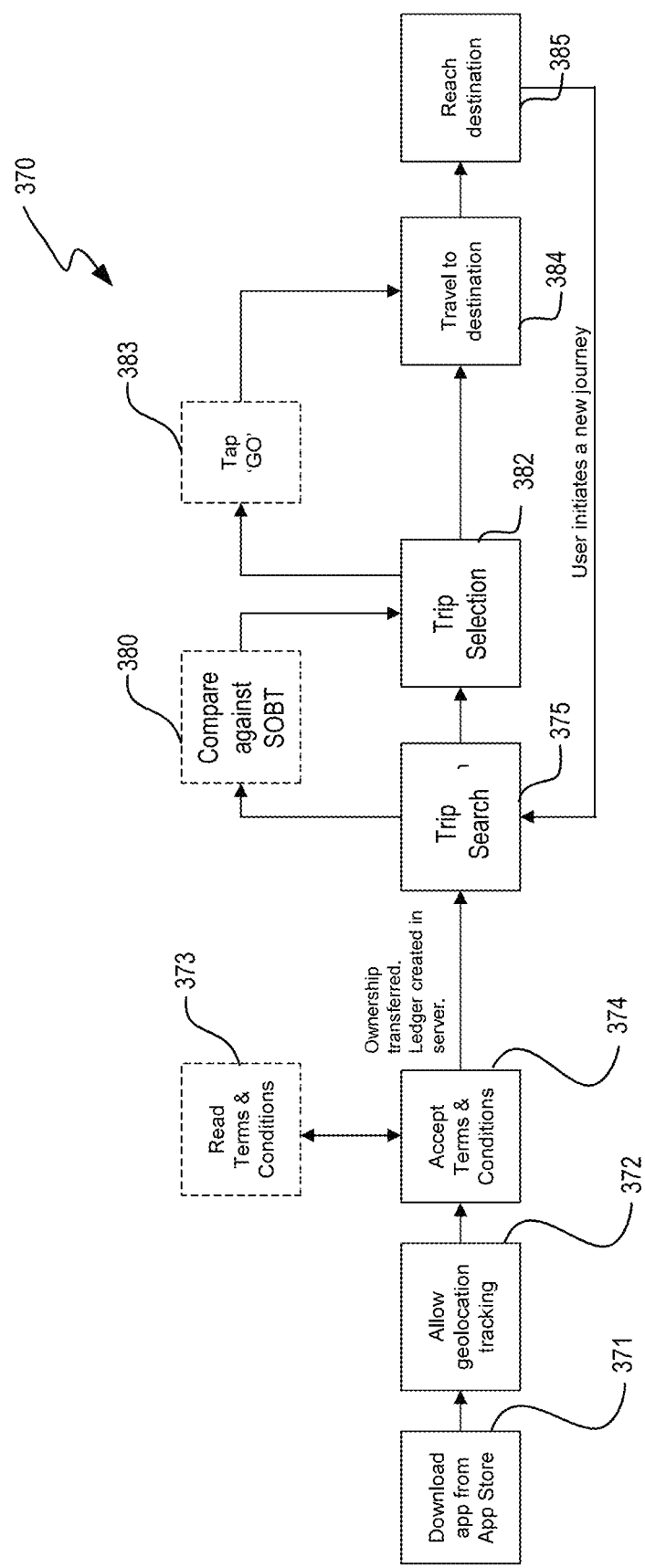
FIG. 3 illustrates a method performed by a user interacting with a modal shift application installed on the user's device.

FIG. 3 illustrates a method 370 performed by a user interacting with the modal shift application installed on the user's device. Method 370 begins at block 371 with the non-listed user downloading the modal shift application from an application source (e.g. a mobile application store or application marketplace, a web store or other source of device applications). In other embodiments, software or a driver for the modal shift application may be installed on the user device. Alternately, the download step may not be necessary, if equivalent functionality of the modal shift application is built into the hardware or operating system of the user device. Following download and installation, the non-listed user is prompted by the modal shift application to enable geolocation tracking on their user device at block 372, and to review the application's terms and conditions at block 373 and indicate the user's acceptance of these terms and conditions at block 374 (these steps are described in more detail with reference to FIG. 4). Following completion of these steps, the user is established as a LU and is permitted to use the modal shift application to plan a trip using alternative modes of transport that result in a reduction in GHG emissions over the equivalent baseline trip.

At block 375, the user searches for a trip by inputting trip parameters such as destination, travel start time or destination arrival time, limitations for mode of travel, preferred mode of travel, walking or biking time, etc. Non-baseline trip search results (in the form of available trip plans) are returned and are displayed to the user along with their comparison to the baseline trip (e.g. SOBT) at block 380. The user selects from one of the available trip plans at block 382. The user may hit the "GO" button at block 383 to initiate the display of directions to the destination. At block 384, the user travels toward their destination, and arrives at the destination at block 385. Whether or not the user hits the "GO" button at block 383, the modal shift application tracks and records the user's physical movements, including distance traveled for each mode of transport (passenger-kilometers for a defined mode of transport or pkm) for the user's trip. As such, participating users need to enable their device's geolocation function for the duration of their journey.

Figure 4:
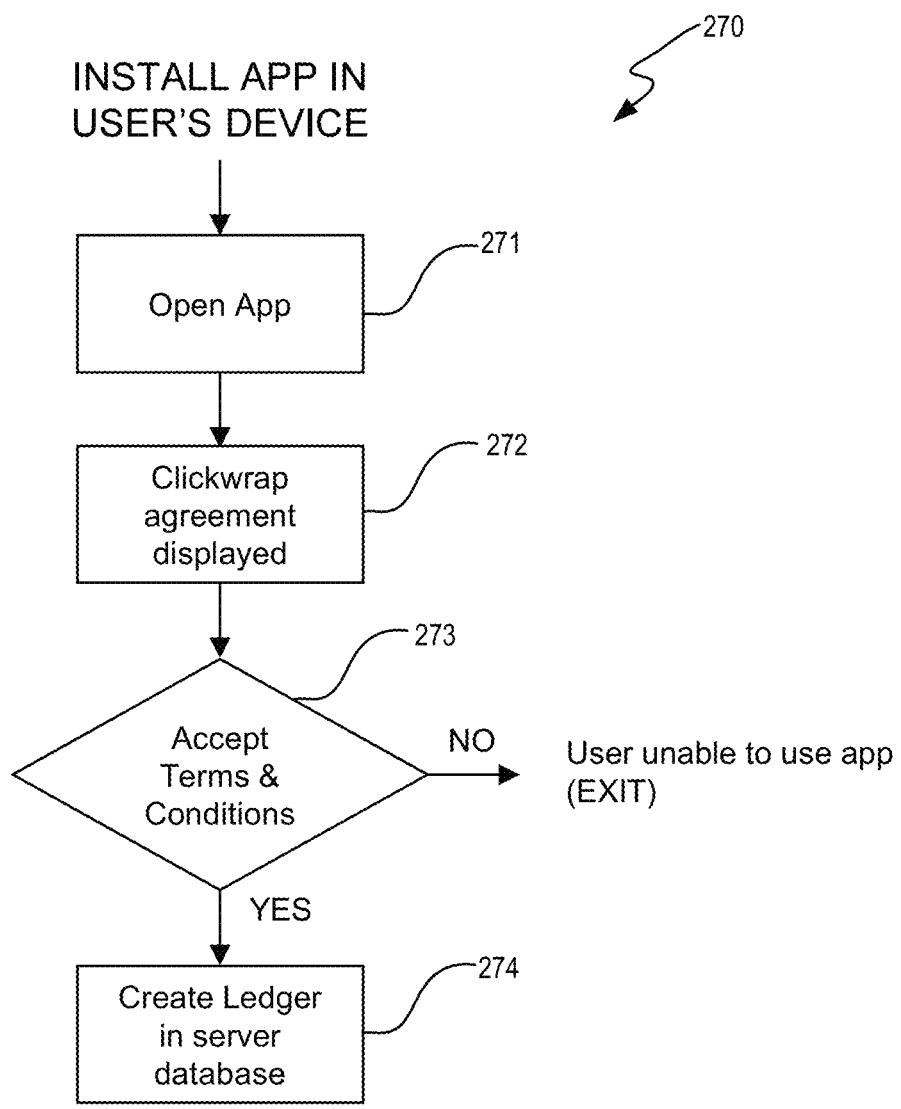
FIG. 4 illustrates a method of establishing a listed user of the modal shift application.

FIG. 4 illustrates a method 270 of establishing a listed user (LU) of the modal shift application according to one embodiment. The method 270 begins after the non-listed user has installed the modal shift application on the user's device. At block 271, the non-listed user opens the application, and is presented with a click-wrap type agreement at block 272, which displays various terms and conditions. One of the terms is that the user will assign and transfer ownership of the environmental attributes, generated by use of the services provided through the modal shift application, to the provider of the modal shift application. The non-listed user is then invited to indicate their acceptance of the terms and conditions at block 273 by performing an action, such as checking a box or clicking on a button. Other forms of indications or acceptance of terms can be used in other embodiments. For example, in some embodiments, acceptance of the terms and conditions, including updates to pre-existing terms and conditions, may be effected through a user accepting the new terms by default as regular users of the service (or contractual services); when purchasing, leasing or using a physical product (e.g. smart watch) that includes an embedded application and through purchasing the product the user is required to accept the terms; by accepting third-party terms and conditions (e.g. social media platform updates their terms and conditions to include transfer of ownership of environmental attributes to a third party). If the user does not indicate their acceptance at block 273, the user is not established as a LU, and will not be permitted to proceed further to use the application. If the user accepts the terms and conditions, the user is established as a LU, and an entry for the LU is created in a carbon offset system user ledger at block 274. LUs listed on the user ledger will have accepted the terms of use of the modal shift application prior to initial use, and will be permitted to use the modal shift application without having to reconfirm acceptance of the terms and conditions upon opening the application again. The steps performed in method 270 enable carbon offset system 120 to establish ownership over carbon offsets produced through emissions savings attributable to the LUs' activities in completing their trips while using the modal shift application.

When the user searches for trip plans to the user's input destination, the user will be presented with the available mode or combination of modes of transport to the destination, which are alternative to the baseline trip (e.g. single occupancy vehicle trip, in certain embodiments). Available modes of transport may include, for example, walking, bicycling, bicycle-share, bus, transit rail, commuter rail, intercity rail, ferry, taxi (e.g. hybrid or electric taxi), car-share, ride-share or carpooling, cable car, electric vehicles, park and ride, and the like. In particular embodiments, the modal shift application identifies or recommends the trip option that has some desirable characteristic or combination of characteristics such as low cost, reduced travel time, sustainability, health, and the like. In some embodiments, comparisons are made between the located alternative trip options and a SOBT, in terms of parameters such as cost, time, carbon emissions or environmental impact, and the like. The evaluation and ranking of trip options based on these characteristics may be accomplished by comparing differences in parameters of the project trip and the SOBT, using a method such as the method 210 of FIG. 11 (described below). Available trip options, a recommended trip option, and comparisons of trip options to SOBT can be displayed to the user on the graphical user interface of the modal shift application.

Figure 5A:
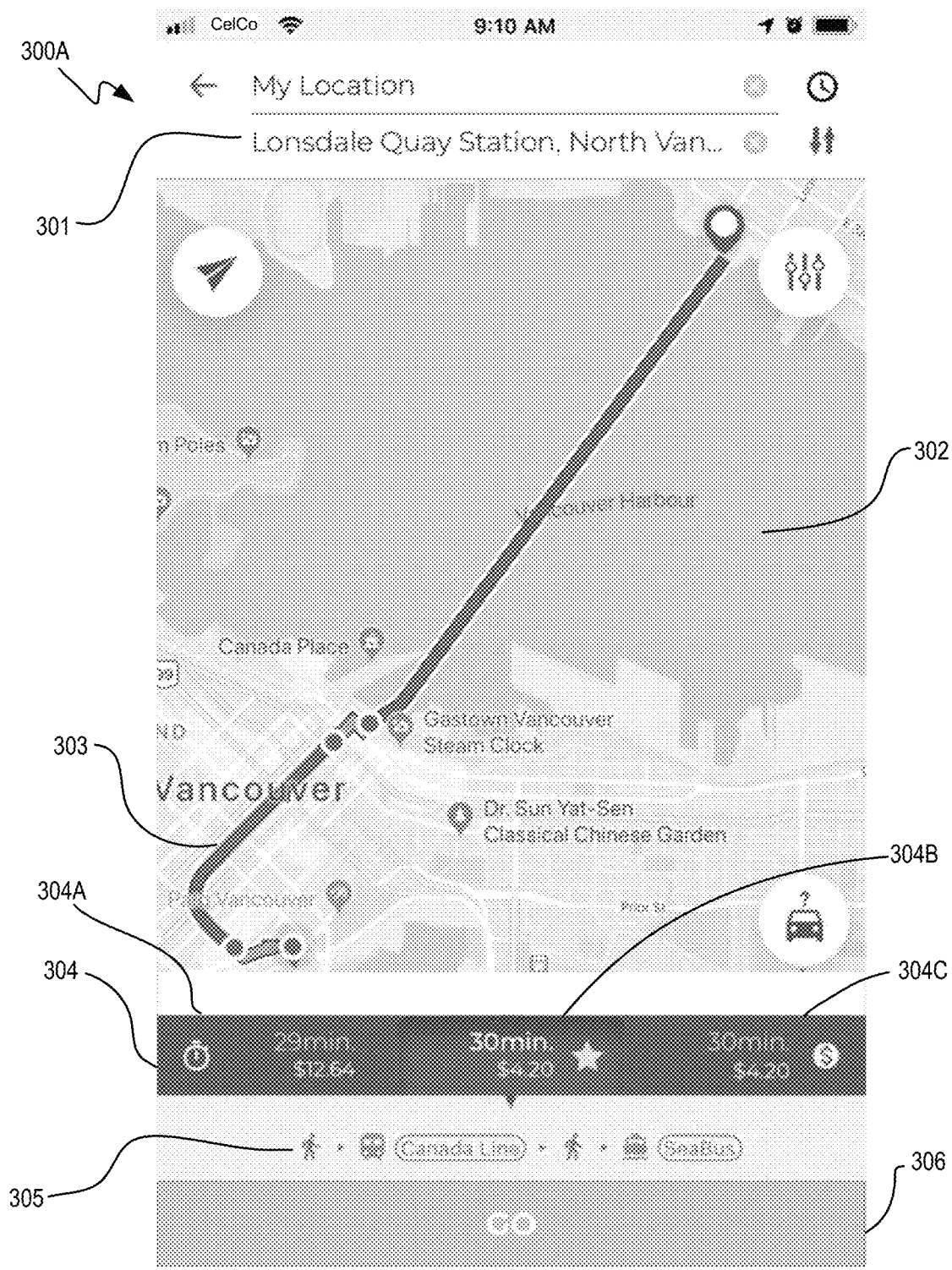
FIGS. 5A and 5B are exemplary screen shots of the graphical user interface for the modal shift application.
Figure 5B:
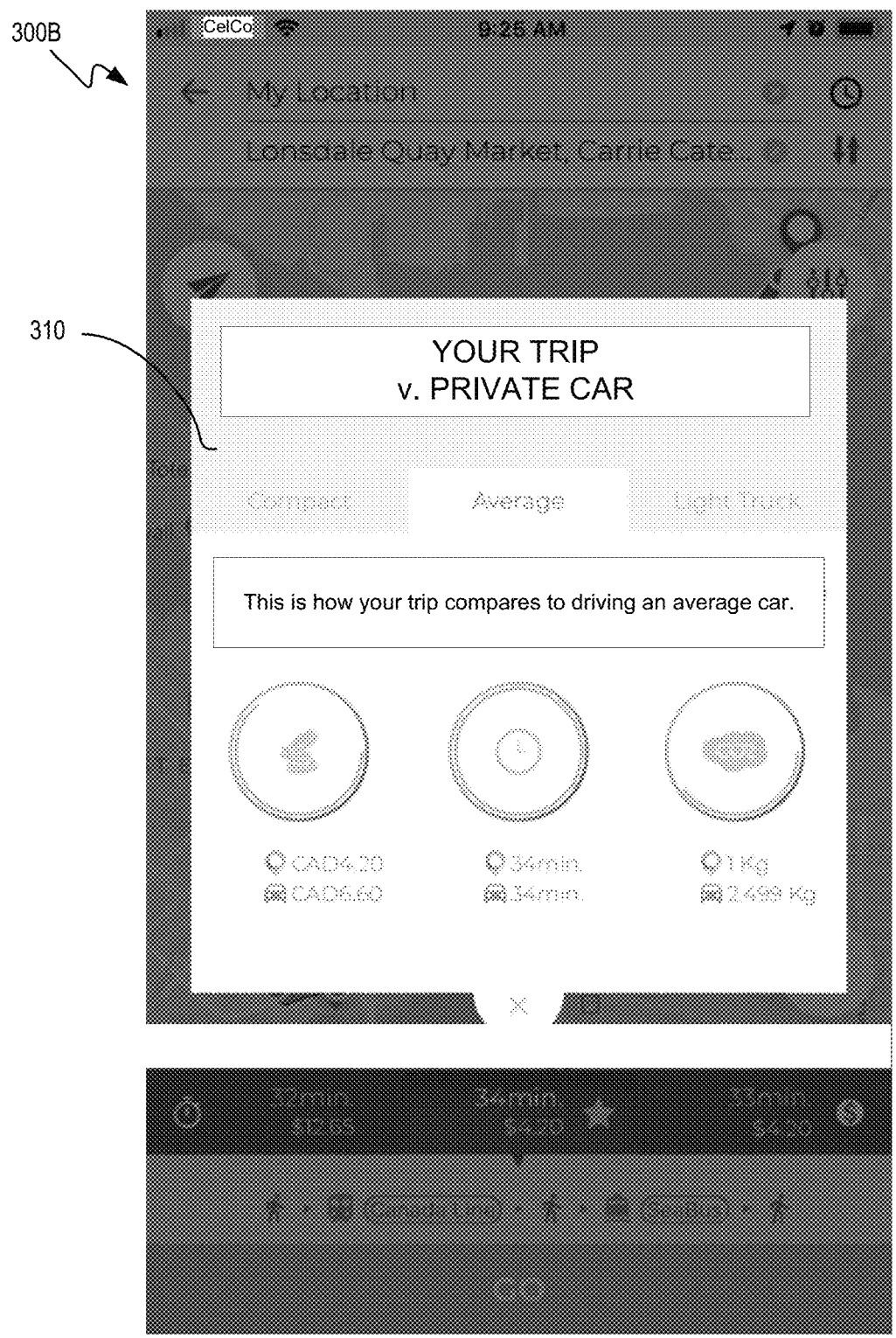

FIGS. 5A and 5B are exemplary screen shots of the graphical user interface for the modal shift application. FIG. 5A is a graphical user interface screen shot 300A displaying the trip results 304 that were located as a result of a trip planning query 301 submitted by the user for trip plans to the user's input destination of "Lonsdale Quay Station" in North Vancouver, from the user's current location. The trip results 304 include a plurality of trip plans or options 304A, 304B and 304C (encompassing various modes of transport) that are alternative to the baseline single-occupancy vehicle trip. As shown in FIG. 5A, the middle option 304B for the requested trip 303 is selected and displayed in the map area 302 of the graphical user interface. As seen in trip summary bar 305 which summarizes the combination of modes of transport for the selected trip option 304B, trip option 304B includes walking, transit rail (Canada Line), walking, and ferry (SeaBus). The user can click on the "GO" button 306 to initiate display of detailed directions to the destination in accordance with the selected trip option 304B.

FIG. 5B is a graphical user interface screen shot 300B showing a comparison between the trip option selected in the example of FIG. 5A and a single-occupancy private vehicle trip. As seen in FIG. 5B, different sizes or types of private vehicles can be selected for comparison (i.e. compact, average, and light truck). The average-size vehicle has been selected for comparison in the illustrated example. In the example of FIG. 5B, parameters including cost, time and carbon emissions are displayed on the comparison dashboard 310 for the selected trip option and for the baseline option using an average-sized private vehicle. Data for carbon emissions for both the baseline trip as well as the different segments of the project trip can be calculated using official sources of data such as the United States Environmental Protection Agency or Statistics Canada, or using other sources of such data which may include official or non-official sources.

As noted previously, "additionality" evaluates whether the GHG emission reductions achieved by an activity is additional to what would have happened if the activity had not been implemented because of the carbon offset project, wherein additionality is assessed with reference to a "baseline" (which characterizes the proposed activities in the absence of the carbon offset project, holding all other factors constant). Baseline emissions are quantified based on a two-step approach. Step one is the quantification of the baseline emissions that would have been produced in the absence of the carbon offset project. In the second step, a discount factor (e.g. MoR) is applied to discount the baseline emissions. The discount factor can be specific to each geographic region, and expresses the likelihood (common practice) of a baseline mode of transport (e.g. single-occupancy vehicle) being used to complete the trip in a particular geographic region. Where the baseline is a SOBT, the discount factor is a MoR which is typically expressed as a percentage of trips that are single-occupancy vehicle trips for a geographic region, based on official or other sources of such data (as indicated, for example, in FIGS. 13A and 13B).

Figure 6:
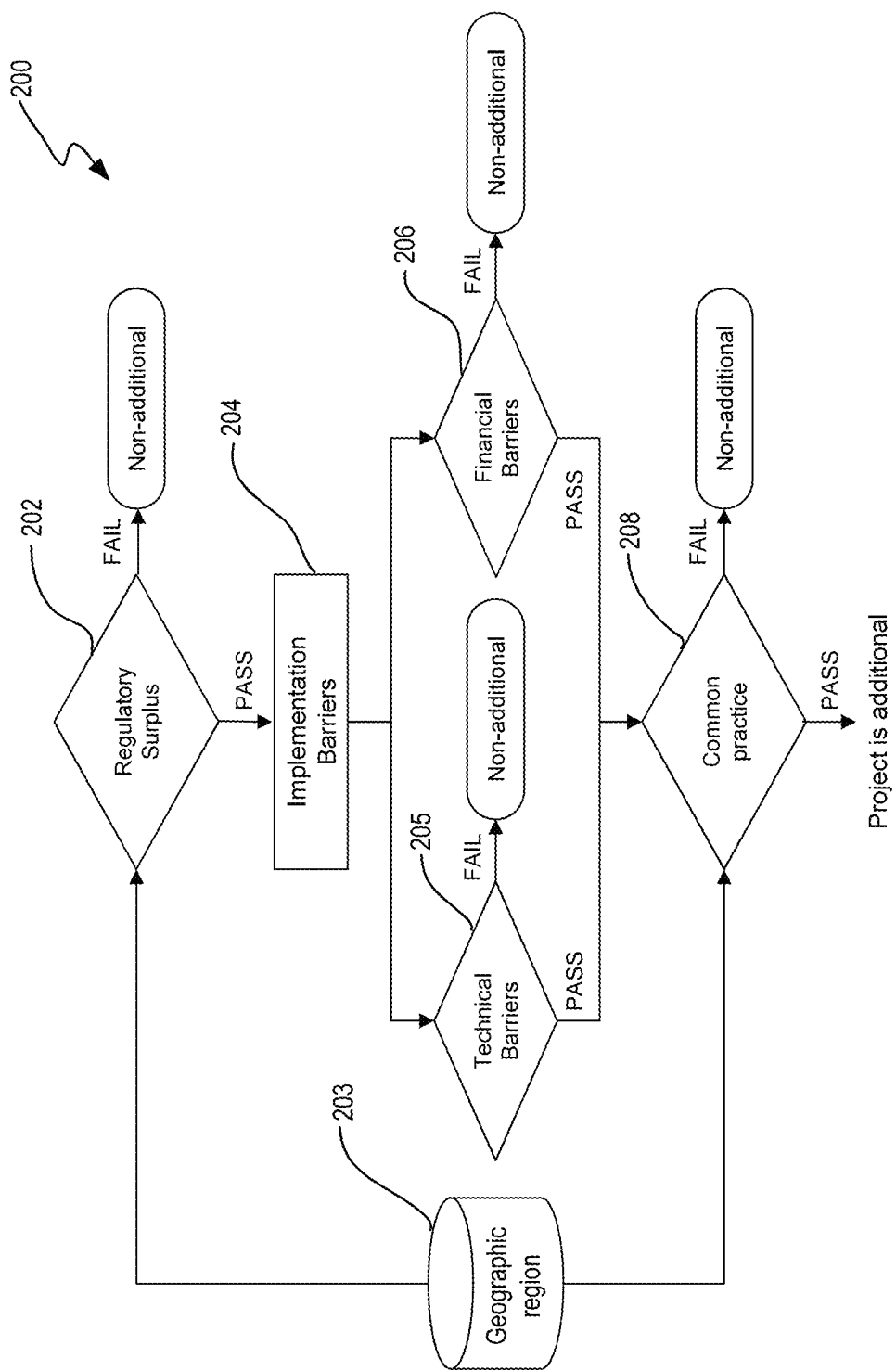
FIG. 6 is a flowchart of a method of demonstrating the satisfaction of the additionality criteria by a technology-driven carbon offset system in the transportation sector.

FIG. 6 is a flowchart of a method 200 of demonstrating the satisfaction of the additionality criteria by a technology-driven carbon offset system in the transportation sector. Method 200 begins at block 202 by evaluating, for a particular geographic region 203, whether there is an opportunity for carbon emissions to be reduced, beyond that which is required by law (e.g. some of the reductions are voluntary in the geographic region 203). If the answer is "no" (for example, where modal shift is mandated by laws, statutes, policies or other regulatory frameworks within the geographic region 203), then no regulatory surplus of carbon offsets is available for trade and therefore the additionality criteria cannot be satisfied. Otherwise, if the answer is "yes", a regulatory surplus of carbon offsets is available for the transportation sector at block 202, and the method proceeds to block 204 by considering barriers such as technical implementation barriers 205 and financial implementation barriers 206 to the introduction of a carbon offset program.

In general, a carbon offset project should meet at least one, and preferably more than one, of these implementation barriers in order to be considered additional:

1) Financial Barriers. The financial barriers test addresses how carbon financing impacts the project in question. Generally, a project is considered additional if it would not otherwise be profitable without the revenue generated by the carbon offsets. Financial barriers tests are generally considered to be one of the more rigorous and stringent tests of additionality. Two types of financial barriers a project can face include capital constraint and internal rate of return. The capital constraint test addresses whether a project would have been undertaken without carbon financing. Internal rate of return indicates whether or not a project would have met established targets for internal rates of return without carbon financing. These are not the only acceptable tests of financial barriers.

2) Technological Barriers. There are several categories of assessment that could fall under this test. A project is generally considered to be additional if it promotes the accelerated adoption of a technology that would otherwise face impediments to adoption; it is considered additional because the increased rate of adoption is assumed to result in lower emissions. For example, if a more energy efficient, though more expensive to manufacture, model of a hot water heater is available and the additional cost is barring its entry into the market, carbon financing can help bridge that gap and bring a technology to market that otherwise would not have been feasible. In this case, the GHG reductions resulting from the deployment of the new technology would go beyond business as usual and would facilitate the expansion of supporting infrastructure for technology implementation, as well as the additional training of personnel. The question is whether the primary benefit or purpose of the technology in question is its GHG reduction capabilities.

3) Institutional Barriers. Institutional barriers can be organizational, social or cultural. If a GHG reduction project falls outside of the normal purview of a company or organization and there is reluctance to implement a project that is not within that purview or to capitalize a project with uncertain returns, the development of a protocol can often assist in overcoming that barrier by increasing management awareness of the benefits and achieving consensus within the organization. The question is whether the project faces significant organizational, cultural or social barriers that the carbon offset project will help overcome.

At block 204, if no implementation barriers exist to the trade of carbon offsets in the transportation sector to reduce GHGs, the additionality criteria cannot be satisfied for the carbon offset system. However, where barriers such as technical implementation barriers 205 and financial implementation barriers 206 would hinder the harvesting and trade of carbon offsets, a carbon offset system which provides benefits that are able to overcome such implementation barriers would satisfy the criteria at block 204. Technical implementation barriers 205 may include, for example, difficulties in tracking multiple modes of transport taken in a single trip (including the first and last mile of the user's trip, for example, and alternative modes of transport such as taxis, ride-hailing, car-sharing, bicycle-sharing, electric scooters, etc. or private means of transport such as a user's own bicycle); challenges with respect to accurately collecting massive amounts of data (for example, existing systems rely on estimates and data from aggregated users who use bus rapid transit or subways, rather than individualized data from each user); and difficulties in providing a technology framework that can be used to establish and track ownership over carbon reductions. Financial implementation barriers 206 may include, for example, the costs associated with developing a carbon offset project, precluding providers of small-scale forms of transportation from being able to implement and capitalize on the carbon offset project using the limited resources available to them. Carbon funding is required to meet the internal rate of return for established targets and is required to transition to new technologies, businesses or processes to implement the solution.

For other embodiments, implementation barriers may include institutional barriers (e.g. organizational, social, or cultural) or other social barriers such as a lack of understanding of carbon markets or the reluctance of a group of people (city, neighbourhood, or employees) to shift away from private vehicle use.

If these implementation barriers can be overcome by the benefits of providing a carbon offset system at block 204, method 200 proceeds to block 208 to assess whether the adoption of GHG-reduced activities in the transportation sector are common practice for the particular geographic region 203. In particular embodiments, the threshold for assessing whether using GHG-reduced modes of transport is common practice is set at 25%—where data for the geographic region 203 establishes that 25% or more of the trips are single-occupancy vehicle trips rather than trips using a GHG-reduced mode of transport (such as bicycle, bus, ride-share), the carbon offset system has additionality. For example, in a certain region where over 75% of trips are taken by bicycle or by walking, GHG-reduced activities are considered common practice in that region, and therefore the additionality criteria cannot be satisfied at block 208. On the other hand, in a region where 25% or more of the trips are estimated to be single-occupancy vehicle transport, GHG-reduced activities are not considered common practice in that region, and the additionality criteria is satisfied at block 208.

As explained in the description that follows, the carbon offset system 120 according to embodiments of the invention meets the additionality criteria of method 200 and produces additional GHG emission savings over the baseline. The carbon offset system 120 satisfies the regulatory surplus step at block 202 (as it is deployed in geographic regions where modal shift is not mandated by law or exchange of carbon offsets is voluntary, etc.), provides technology to overcome existing technical and financial implementation barriers at block 204, and is implemented in geographic regions where taking reduced GHG means of transport are not common practice at block 208.

Figure 7:
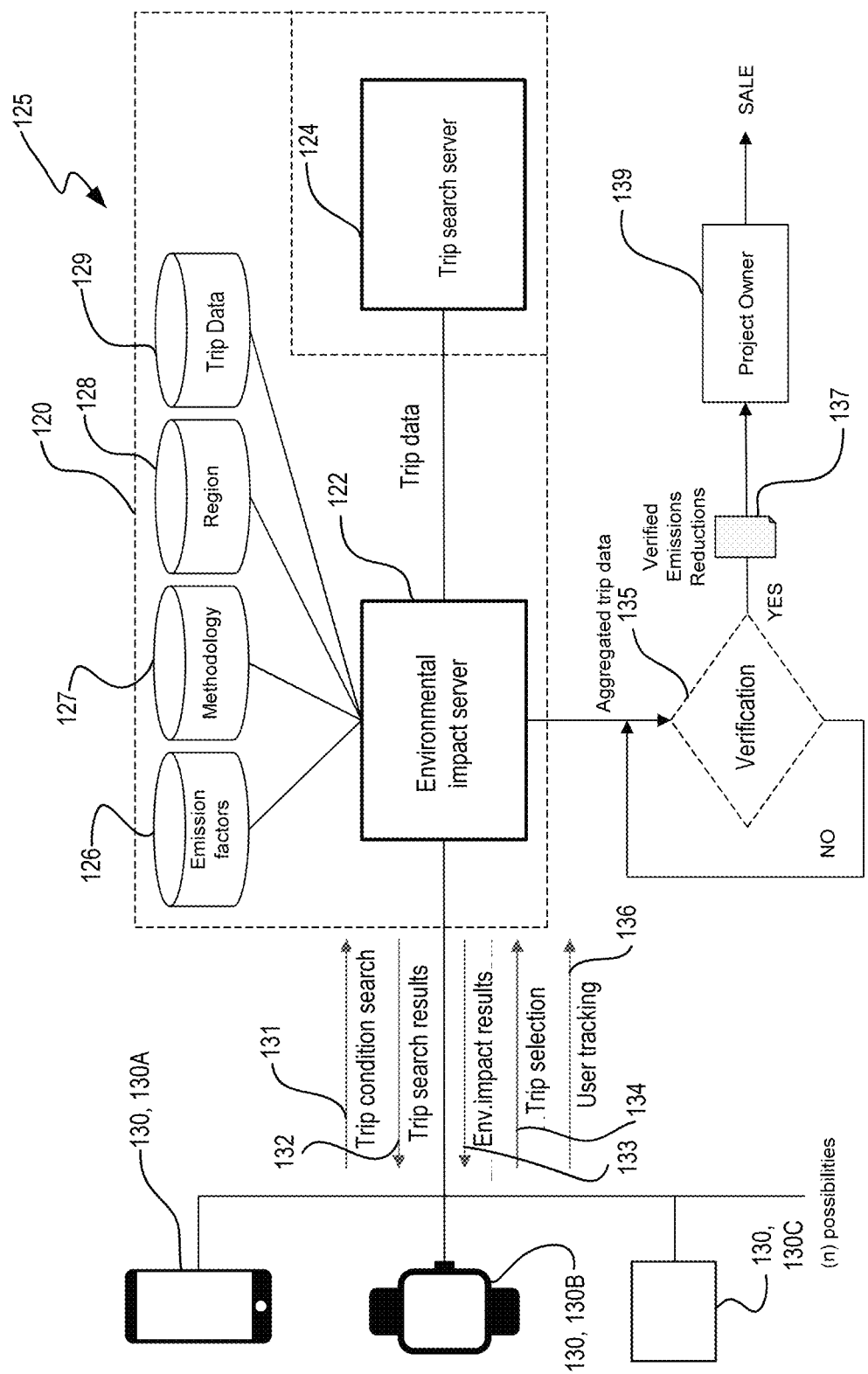
FIG. 7 is a schematic illustration of a carbon offset system.

FIG. 7 illustrates a technology-driven carbon offset system 120 according to one embodiment. System 120 is operable to reduce GHG emissions for a particular project or carbon offset program within an environment 125 that includes a plurality of user devices 130. Representative user devices 130 are shown, consisting of a smartphone 130A, a smart watch 130B, and other portable smart device 130C. User device 130 may comprise any suitable portable device that is capable of connecting to a mobile network, including, without limitation, smart phones, mobile devices, smart watches, hardware installed in a transport vehicle such as a private vehicle (e.g. auto-stop vehicle) or a vehicle's infotainment system, GPS devices, activity tracking devices, and the like. Each user device 130 contains a processor that can execute instructions provided by software (the modal shift application) and is operable to connect to a wireless communication network. The wireless communication network may comprise a cellular phone or mobile network, a satellite communication network, terrestrial microwave network, or any other suitable wireless network or combination thereof. User devices 130 function as information processing terminals which communicate with the carbon offset system 120 over the wireless communication. Each user device 130 is operated by its respective user as the user travels to their destination, following a trip plan provided by the modal shift application. For the purpose of describing the carbon offset system 120, users are assumed to be making a local trip (i.e. the start and end points of the trip are generally within the same urban agglomeration). However, carbon offset system 120 can also apply to users who are travelling larger distances (e.g. between different urban agglomerations, such as between New York and New Jersey). If a user is travelling between urban agglomerations of different geographic regions, the determinations of project and baseline GHG emissions as described herein can be made using data (such as emissions factors and MoR) specific for the geographic region that contains the trip start point.

Environment 125 also includes a verification system 135 for performing a verification process 135 (typically through an independent third party) once data from the carbon offset system 120 is transferred to the verification system. Verification system includes components for validating and verifying carbon offset data provided by the carbon offset system 120 to produce a verification statement by the third party to facilitate the issuance of verified carbon reductions 137 (e.g. in the form of offsets or credits) that can then be recorded in a registry and made available for sale, transfer, banking or retirement by the project owner 139. The project owner 139 is the owner of the GHG emissions reductions for the particular project or carbon offset program.

The carbon offset system 120 of FIG. 7 includes an environmental impact server 122 which is in communication with user devices 130 over the wireless communication network. Environmental server 122 is also in communication with one or more trip search servers 124. Environmental impact server 122 receives from each user device 130 the user's current location information and the user's input (desired) destination, provided through the modal shift application that is installed on the user device 130. The environmental impact server 122 requests, from the one or more trip search servers 124, trip plans to take the user from their current location to their desired destination using alternative (non-baseline) modes of transport. The trip search servers 124 that may be queried to provide trip options may include, for example, a public transit trip planning server, a web mapping and trip planning server for the project region, a taxi trip planning server, and a ride-share trip planning server, or any other server for a provider of trip options using one or more modes of transport that have reduced GHG emissions over the baseline trip. The trip search servers 124 return the available trip plans to the environmental impact server 122, which communicates the trip plans (including details for each plan) to the user device 130 and displays them on the user interface provided in the modal shift application. Some or all of the trip plans may be multi-modal, incorporating a plurality of modes of transport such as walking, bus, transit rail, commuter rail, intercity rail, ferry, taxi ride, ride-share and/or bicycle-share, etc. Using the modal shift application, the user selects one of the trip plans and commences the trip. Where a trip plan is selected, directions for taking the user to their destination in accordance with the trip plan can be provided to the user. These directions can be provided visually (e.g. through a user interface displaying the directions on the user device screen) or through the use of lights (e.g. flashing lights on the user device), projected visual aids (e.g. head-up display (HUD) over a windshield, smart glasses, floor, etc.), through sounds (e.g. audible directions), vibrations (e.g. through a wristband or similar device, or by touch (e.g. Braille for the visually impaired), or any combination of the above.

During the user's trip, the user's physical movements, including mode of transport and distance traveled for each mode of transport (passenger-kilometers for a defined mode of transport or pkm), are recorded through the modal shift application. Tracking of user trip data is performed by enabling geolocation services (e.g. Global Positioning System (GPS) tracking) on the user's device, which determines and reports to the modal shift application the position (e.g. in GPS coordinates) of the device throughout the user's trip. Such user trip data is tracked locally on the user device and uploaded to environmental impact server 122 regularly (e.g. every few seconds). (Alternately, in other embodiments the user trip data is uploaded to the environmental impact server 122 at the user or server's request.) The environmental impact server 122 causes the user trip data to be stored in the trip data store 129 where it can be centrally managed by carbon offset system 120.

Other servers or data sources that are part of carbon offset system 120 and which store programs or data that are accessible to and managed by environmental impact server 122 include emissions factor data store 126 (storing information such as emissions factors for each mode of transport in each geographic region), methodology server 127 (storing programs for determining net GHG emissions savings from user trip data) and region data store 128 (storing other information specific to each geographic region such as MoR). Each of emissions factor data store 126, methodology server 127, region data store 128 and trip data store 129 may be provided or stored on the same machine(s) that hosts environmental impact server 122 or they may be provided or stored on other servers or devices that are in communication with environmental impact server 122.

To quantify GHG emissions data from an individual's physical movements in urban agglomerations or cities and convert such data to verifiable and tradeable environmental attributes, information and commands are exchanged between user devices 130 and environmental impact server 122 of carbon offset system 120. As illustrated in FIG. 7, the exchange of information between user devices 130 and environmental impact server 122 include: trip conditions 131 originating from the user, defining the parameters for the user's requested trip, such as user's current location (start point), desired destination, travel start time or destination arrival time, limitations for mode of travel, preferred mode of travel, etc.; the trip search results 132 comprising trip plans meeting the trip parameters, as returned to the user by the environmental impact server 122; environmental impact results 133 for each of the trip options returned to the user by the environmental impact server 122, which results may include total trip time, distance traveled, and/or environmental consequences/benefits for each trip option, and the like; a trip selection 134 made by the user after viewing the trip options; and user tracking data 136 comprising the user's trip data (including mode of transport and pkm for each mode of transport) recorded as the user is making the trip to their destination. The user may make the trip to their destination using one or more modes of transport in accordance with the selected trip plan. Alternatively, the user may deviate from the selected trip plan while making the trip to their destination. However, regardless of whether the user follows the selected trip plan or deviates from the selected trip plan, for particular embodiments only the trip data for completed trips to the user's destination would be included for purposes of determining GHG emissions savings in particular embodiments. Partially completed trips would be excluded from the carbon offset program.

The sources of GHG emissions considered within the project boundary are: (1) emissions from burning of fossil fuels by fossil fuel vehicles (FFVs); (2) indirect emissions from off-site generation of electricity required for certain modes of transport, such as plug-in electric vehicles (PEVs), e-bicycles, e-scooters, and the like and other modes of transport which require periodic charging; and (3) indirect emissions from off-site generation of electricity required to run the services provided through the modal shift application on various server(s) (e.g. environmental impact server 122 and trip search server 124). These sources of GHG emissions can be factored into the determination of net GHG savings, described with references to FIGS. 8, 9, 10 and 12 below.

Figure 8:
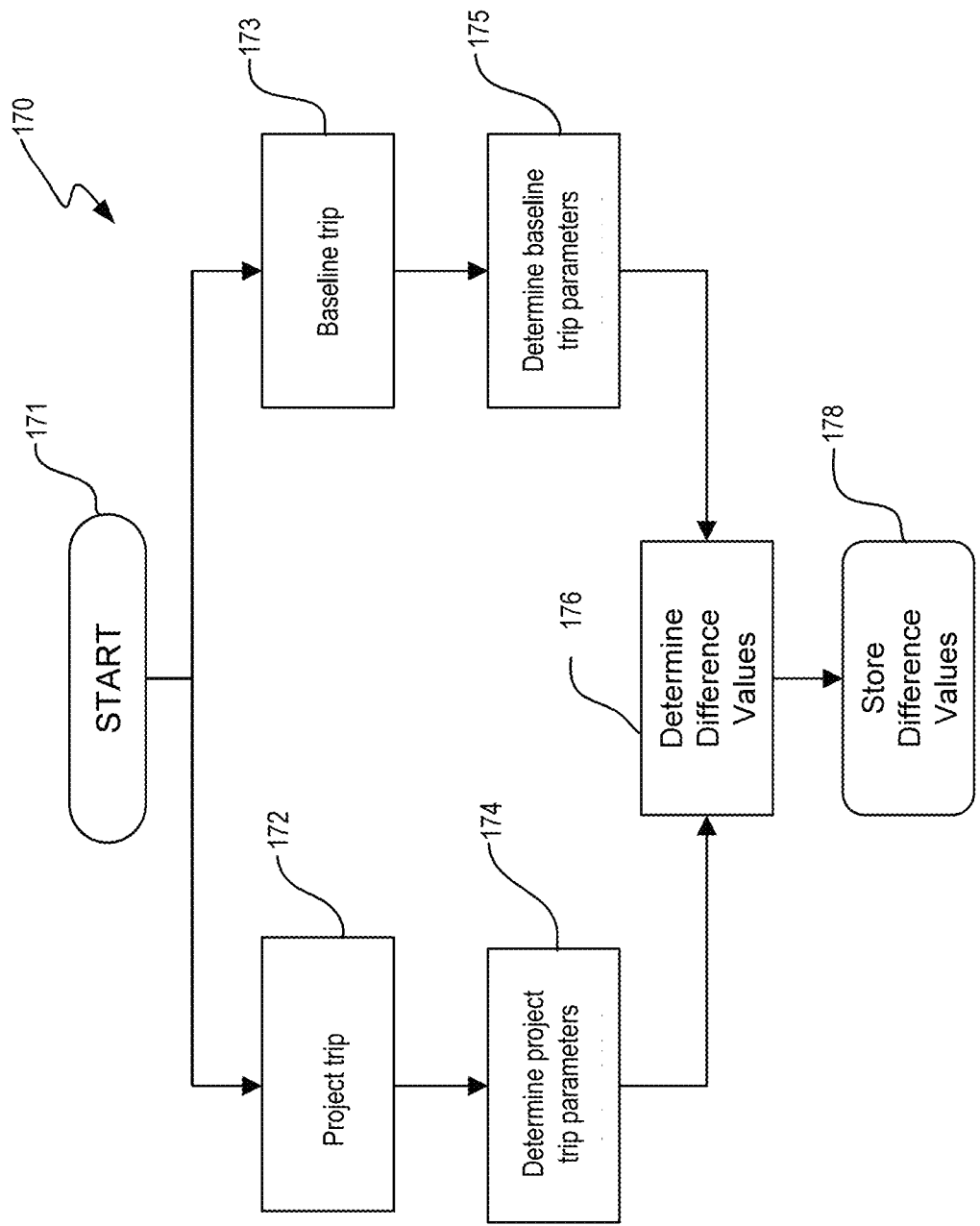
FIG. 8 illustrates a method of determining differences in values of parameters between a completed project trip and baseline trip.

FIG. 8 illustrates a method 170 of determining differences in values of parameters between a completed project trip and baseline trip, including net GHG emissions savings (and other values of interest), in accordance with one embodiment. Method 170 commences at block 171 once the user has completed the project trip, and the user's trip data has been reported to the environmental impact server 122. Method 170 identifies and computes the project trip parameters (at blocks 172, 174) and the baseline trip parameters (at blocks 173, 175), and determines differences in various project trip and baseline trip parameters, including net GHG emissions savings. The differences in values between project and baseline trip parameters are stored at block 178. The steps for determining the project trip parameters (at blocks 172, 174) are described in more detail below with reference to FIG. 9. The steps for determining the baseline trip parameters at (blocks 173, 175) are described in more detail below with reference to FIG. 10. The steps for determining the differences in various project trip and baseline trip parameters at block 176 are described in more detail below with reference to FIGS. 11 and 12. Similar reference numerals are used to denote similar steps performed in the methods illustrated.

Figure 9:
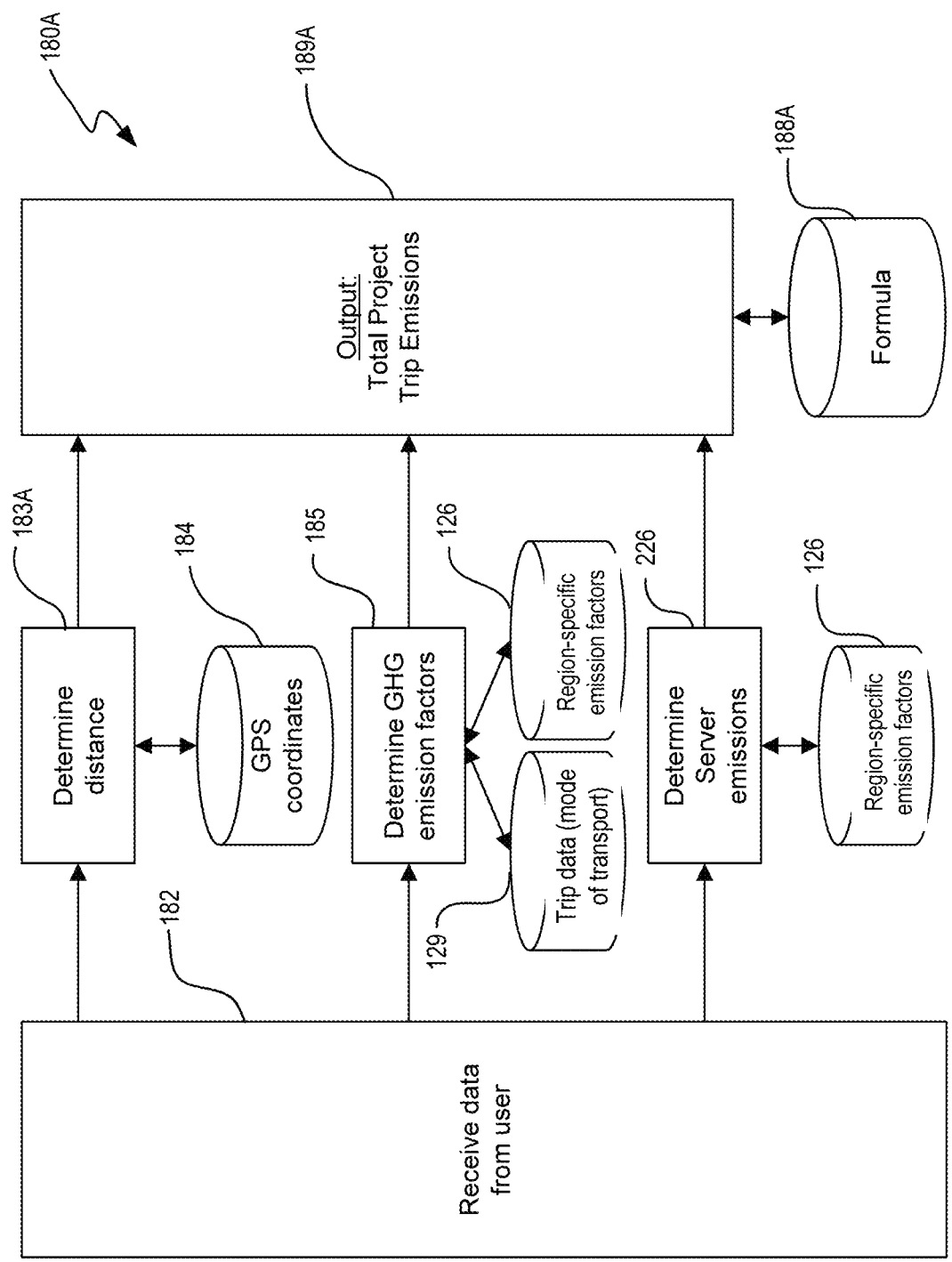
FIG. 9 is a data flow chart for a method of determining project trip parameters.

FIG. 9 is a data flow chart for a method 180A of determining project trip parameters. Method 180A begins at block 182 by receiving data from the user of the modal shift application. This data may include the user's trip data for a completed trip (e.g. including actual start and end points for the trip or any other significant points and geolocation information recorded during the user's trip). Based on such user data, a distance traveled for each mode of transport can be determined at block 183A. In particular, the geolocation tracking data 184 recorded from the user's device can be used to determine distance traveled for each mode of transport. Alternately, distance travelled for the trip or for one or more segments of the trip could be ascertained using available means of identifying a user at a particular location (typically, at a point of entry or exit), such as through use of a smart card (e.g. used for accessing transit or other modes of transport), personal credit card, mobile payment, key fob, facial recognition technology, fingerprints, retina scan, and the like. This information could be used to identify the start point of the segment or trip and the end point of the segment or trip, and to calculate the distance travelled between those two points. GHG emissions factors for the project trip can be evaluated at block 185 based on the trip data 129 (including mode of transport and distance travelled for each mode of transport, as determined at block 183A), and region-specific emission factors 126 for the modes of transport taken. For example, the relevant region-specific emission factors 126 can be obtained from an emission factors table such as the one shown in FIG. 13A, which lists the emission factors for various modes of transport in specific geographic regions according to one example. To determine project emissions, server emissions data 226 is also determined (which can be calculated from region-specific emission factors 126).

According to a particular embodiment, total project emissions $PE_{tr}$ for a completed trip tr taken by a user is calculated at block 189A of method 180A by summing emissions from all sub-trips taken with the various modes of transport in accordance with equation 188A as follows:

$$PE_{tr} = \left( \sum_{i=1}^{n} (TRIP_{pkm_i} * EF_{modeT_i}) \right) + EA_{ectSU}$$

where:
- n is the total number of segments each of which is taken in a particular mode of transport;
- $EF_{modeT}$ is the emission factor specific to the mode of transport and start point jurisdiction;
- $TRIP_{pkm}$ is the single trip distance on actual monitored trip distance per mode of transport (i.e. pkm for a particular segment taken in a specific mode of transport); and
- $EA_{ectSU}$ is the emission allocation for electricity generation used for running the servers. In particular embodiments, server emissions are calculated based on the emissions factors of electricity for the geographic region in which the environmental impact server(s) that provide the modal shift application services for the user device are located. In some embodiments, a fixed value for the server emissions (based on the location of the servers) can be used per trip.

Figure 10:
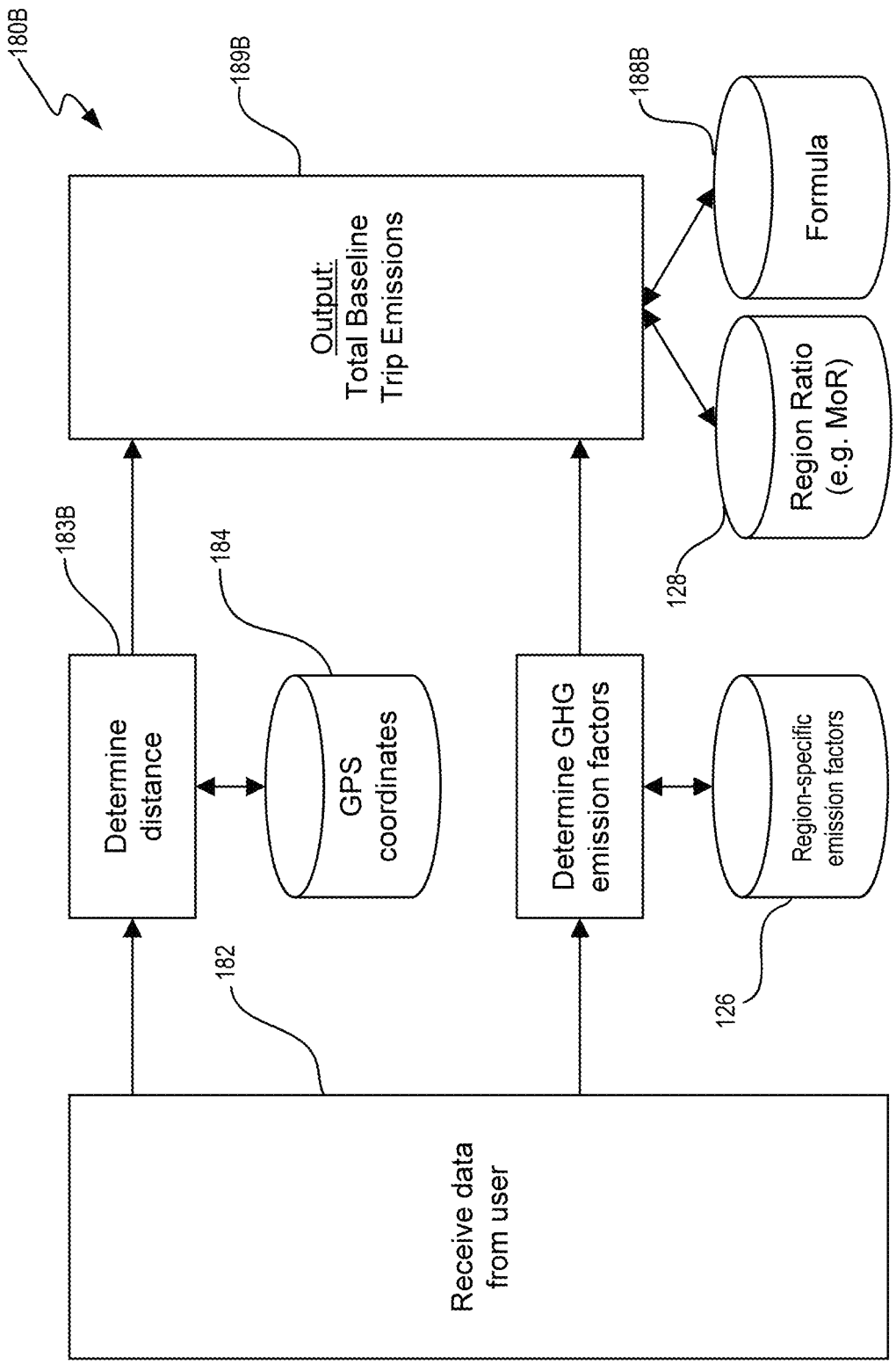
FIG. 10 is a data flow chart for a method of determining baseline trip parameters.

FIG. 10 is a data flow chart for a method 180B of determining baseline trip parameters where the baseline is SOBT. Method 180B begins at block 182 by receiving data from the user of the modal shift application (e.g. trip data for the completed trip). Based on such user data, the distance of an equivalent baseline single-occupancy vehicle trip between the start point and end point is determined at block 183B. In particular, the geolocation tracking data 184 obtained from the user's device at the start of the journey can be used to determine the start point, and the user's input destination (e.g. "Park Royal South") can be used to look up the latitude and longitude of the end point of the trip. In addition, GHG emissions for the baseline trip can be evaluated at block 187 based on the distance for the equivalent baseline single-occupancy vehicle trip and region-specific emission factors 126 for the baseline mode of transport. The emission factor for the baseline mode of transport for the applicable geographic region can be obtained from the table in FIG. 13A. Total baseline emissions $BE_{tr}$ for an equivalent single-occupancy baseline trip tr that could have been taken by the user to reach the end point (destination) of the user's completed trip is calculated at block 189B of method 180B in accordance with equation 188B as follows:

$$BE_{tr} = SOBT_{pkm} * EF_{modeT} * MoR_{SOV}$$

where:
- $SOBT_{pkm}$ is the single-occupancy baseline trip distance;
- $EF_{modeT}$ is the emission factor specific to the mode of transport for the start point jurisdiction; and
- $MoR_{SOV}$ is the modal ratio for single-occupancy vehicles for the start point jurisdiction, which is used to discount the baseline emissions. The $MoR_{SOV}$ can be obtained from a data store 128 that provides region-specific modal ratio values. Some example modal ratio values for various geographic regions are shown in FIG. 13B.

Figure 11:
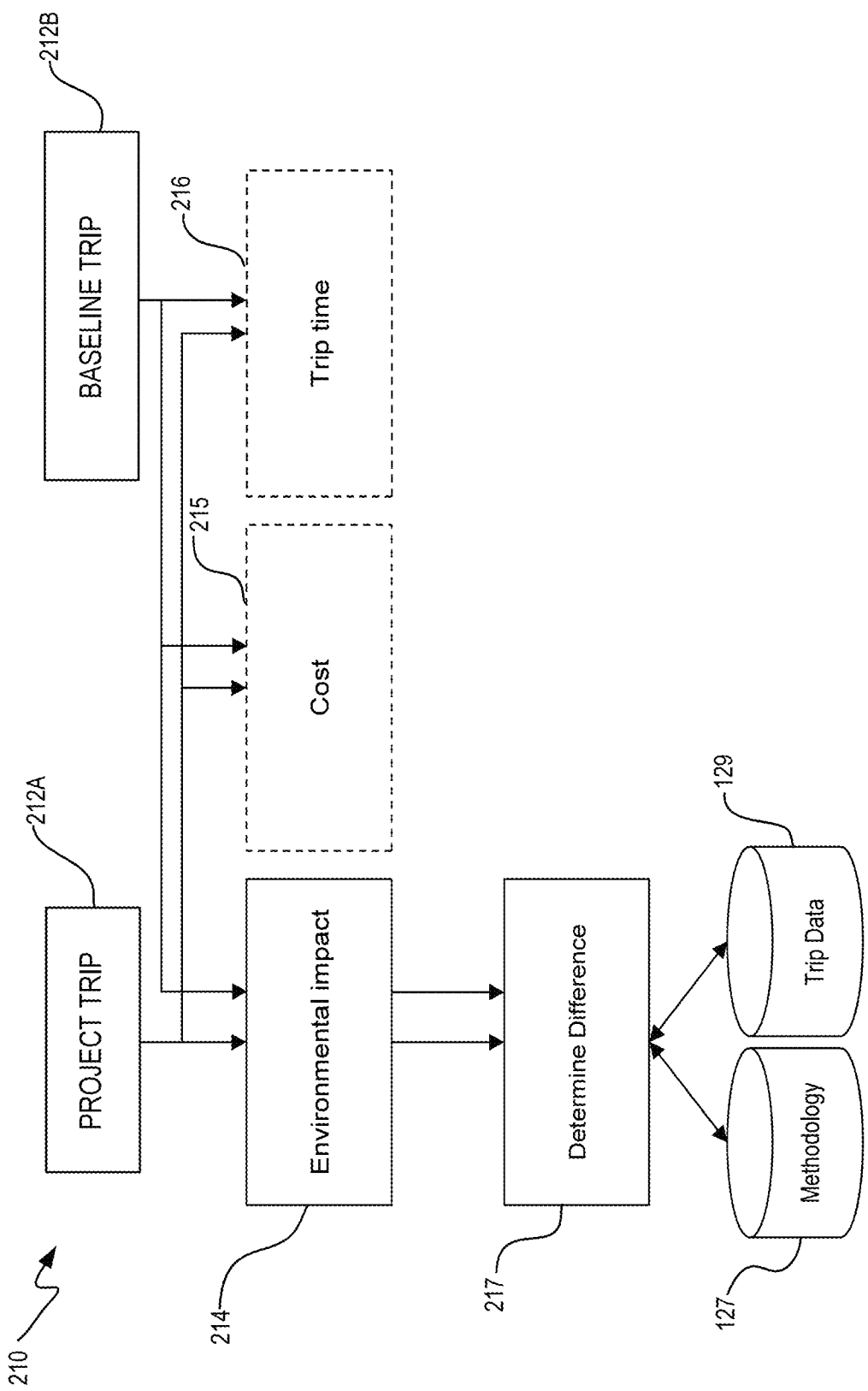
FIG. 11 illustrates a data flow chart for a method of determining differences between project trip and baseline trip parameters.

FIG. 11 illustrates a data flow chart for a method 210 of determining differences in environmental impact, cost and trip duration between a project trip 212A and a baseline trip 212B. Method 210 can be performed prior to a project trip 212A being initiated (as the user is searching for and evaluating different trip options), and/or after the project trip 212A has been completed (after reporting of user trip data tracked through the user device's geolocation function). Method 210 includes a determination in the difference of environmental impact at block 214 by assessment of the carbon emissions for the project trip 212A and the baseline trip 212B. A difference in the carbon emissions is determined at block 217 and may be based on the methodology 127 described herein and applying trip data 129 (which can be projected trip data where the trip has not yet been completed, or actual recorded trip data where the trip has been completed). Further details of the methodology for determining a difference in carbon emissions are set forth below with reference to FIG. 12. In addition, a determination in differences in cost and trip duration between the project trip 212A and baseline trip 212B can be optionally calculated at blocks 215 and 216 respectively; these can be generally obtained through subtraction of these values.

Figure 12:
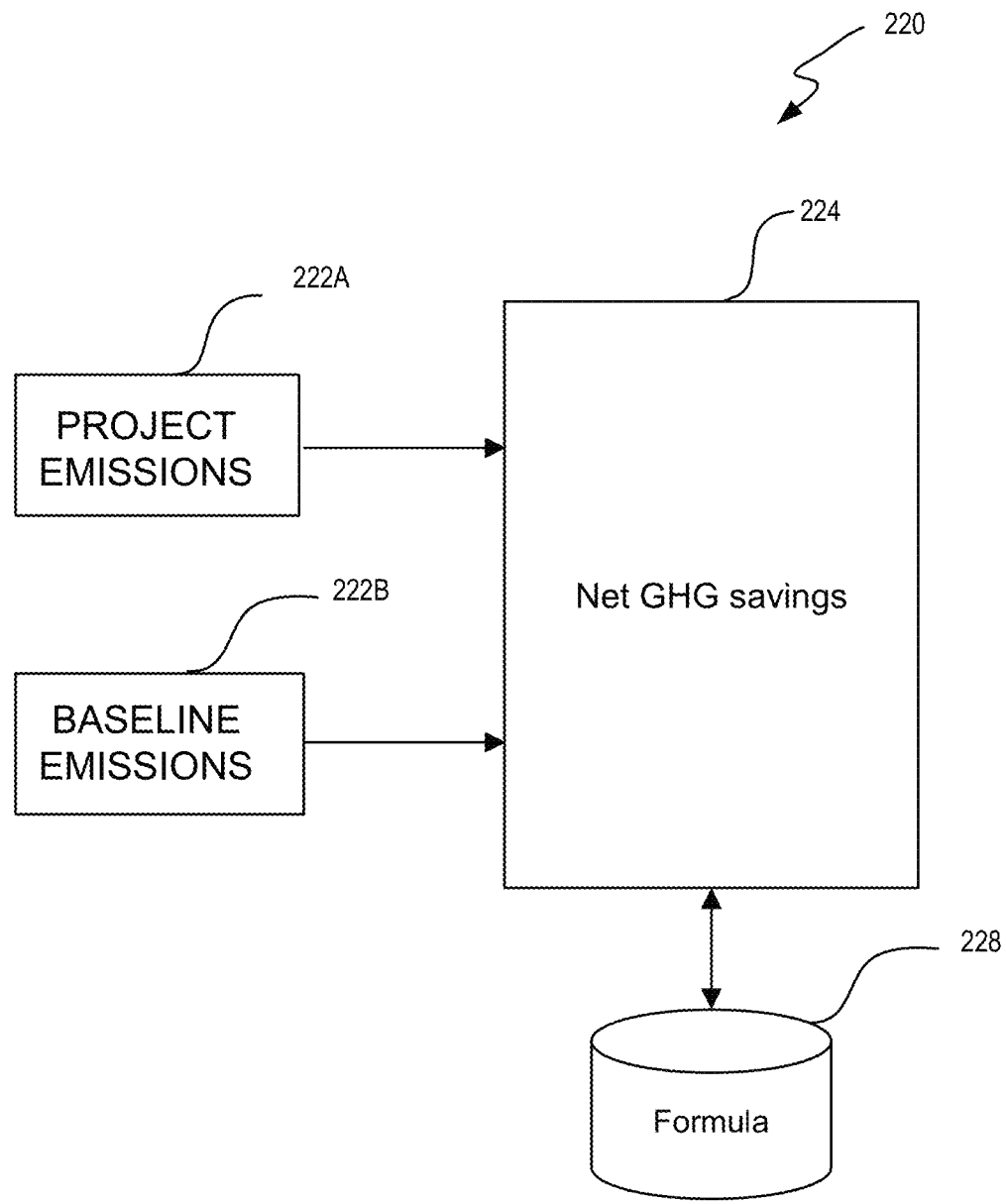
FIG. 12 is a schematic illustration for the determination of the net GHG emissions savings produced by a carbon offset system.

FIG. 12 illustrates a data flow chart for a method 220 of converting the differences in emissions between project and baseline trips to net GHG savings (or a reduction in environmental impact). Method 220 begins by receiving project emissions data 222A (as calculated using method 180A of FIG. 9, for example) and baseline emissions data 222B (as calculated using method 180B of FIG. 10, for example). Project emissions data 222A and baseline emissions data 222B are provided to a module 224 for calculating net GHG emission savings using formula 228 set out below.

Net GHG emission savings or reductions $ER_{tr}$ for a trip tr over the baseline can be quantified as a function of baseline emissions $BE_{tr}$ for the trip tr, project emissions $PE_{tr}$ for the trip tr, and leakage $LE_{tr}$ for the trip tr, using the following equation 228:

$$ER_{tr} = BE_{tr} - PE_{tr} - LE_{tr}$$

where project emissions $PE_{tr}$ can be determined using equation 188A above, baseline emissions $BE_{tr}$ can be determined using equation 188B above, and $LE_{tr}$ can be assumed to be negligible (i.e. $LE_{tr}=0$) for the methodology herein, as it is unlikely that individuals would move their trip outside the project boundary due to an increase in modal shift within the project boundary.

Figure 14:
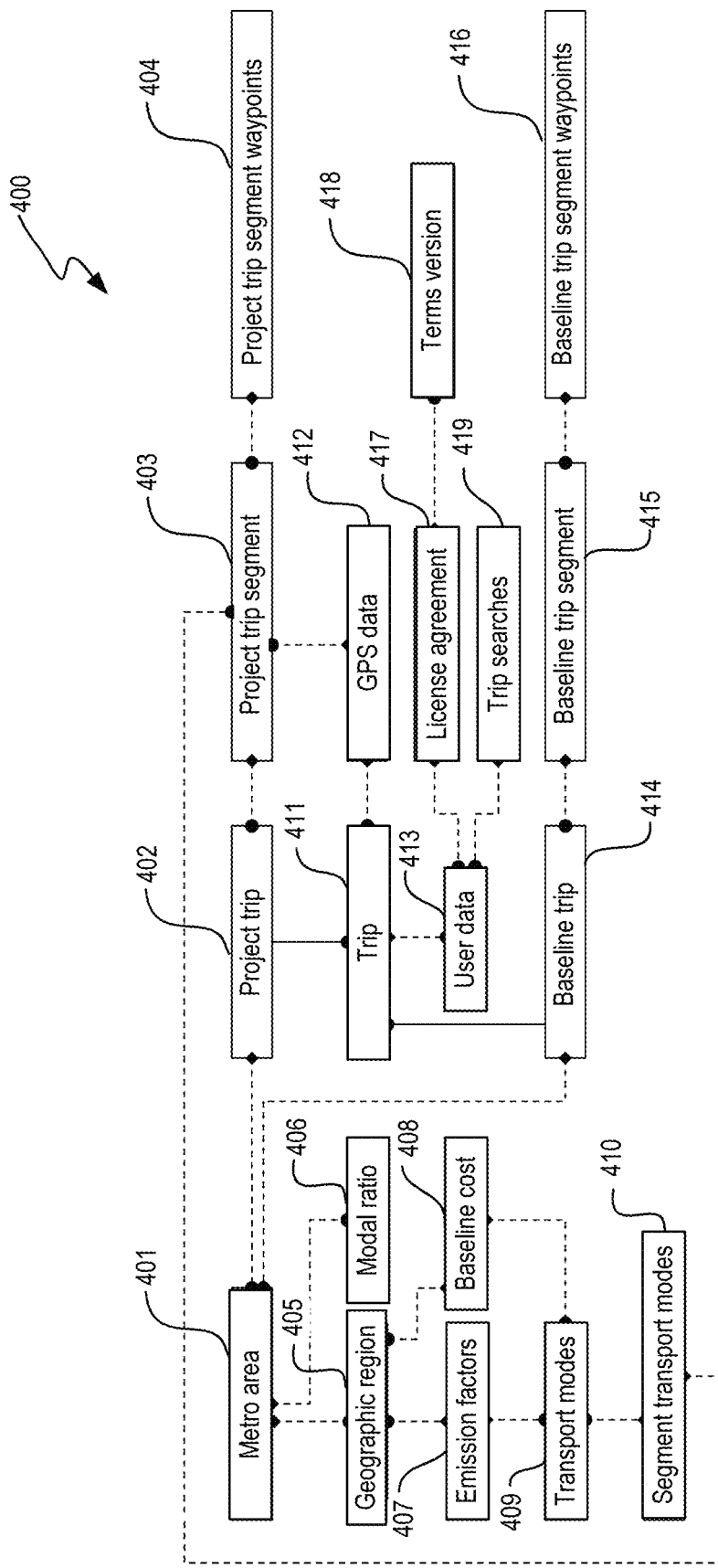
FIG. 14 is an entity-relationship diagram for the data used or generated by the carbon offset system.

FIG. 14 is an entity-relationship diagram 400 for the data used by the carbon offset system. The particular urban agglomeration or metro area 401 in which the project trip 402 is being taken defines certain parameters for the project trip including, for example: (a) the modal ratio 406 for the metro area 401, (b) the emissions factors 407 for each transport mode 409 based on the geographic region 405 in which the metro area 401 is located, and (c) the baseline cost 408 for the baseline transport mode (e.g. single-occupancy vehicle trip) based on the geographic region 405 in which the metro area 401 is located. In some embodiments, a different modal ratio 406 may be assigned to each metro area 401. In other embodiments, modal ratio 406 may be assigned generally to a geographic region 405 encompassing a plurality of metro areas or urban agglomerations. Transport mode 409 contains a complete list of modes of transport in a particular geographic region. Segment transport mode 410 contains a correlation between the transport modes used by the trip planning server and the transport modes 409 and their emission factors 407 used in the environmental impact server.

Metro area 401 also defines the parameters for the equivalent baseline trip 414. Each baseline trip 414 is defined by a plurality of baseline trip segments 415. Each baseline trip segment 415 is defined by a plurality of baseline trip segment waypoints 416.

Similarly, project trip 402 is defined by a plurality of project trip segments 403. Each project trip segment 403 is defined by a set of project trip segment waypoints 404.

In addition, each project trip 402 and each baseline trip 414 is associated with certain trip attributes 411 and user data 413. Trip attributes 411 may include one or more of: carbon emissions (kg of $CO_{2e}$), cost, duration, and geographic region. User data 413 may include one or more of: username, password (nationality/number), photograph of user, first name, last name, middle name, date of birth, last login date/time, home address, work address, preferred route, driving license (yes or no), car type and user category (e.g. whether user is an occasional user or frequent user). Trip attributes 411 is associated with GPS data 412. GPS data 412 may comprise GPS coordinates for start point, end point and other significant way points or other geolocation information tracked by the user's device. User data 413 for a particular user is associated with the user's acceptance of a license agreement 417. License agreement 417 is characterized by the version 418 of the terms that have been accepted by the user. User data 413 for a particular user is also associated with the trip searches 419 made by the user.

Figure 15:
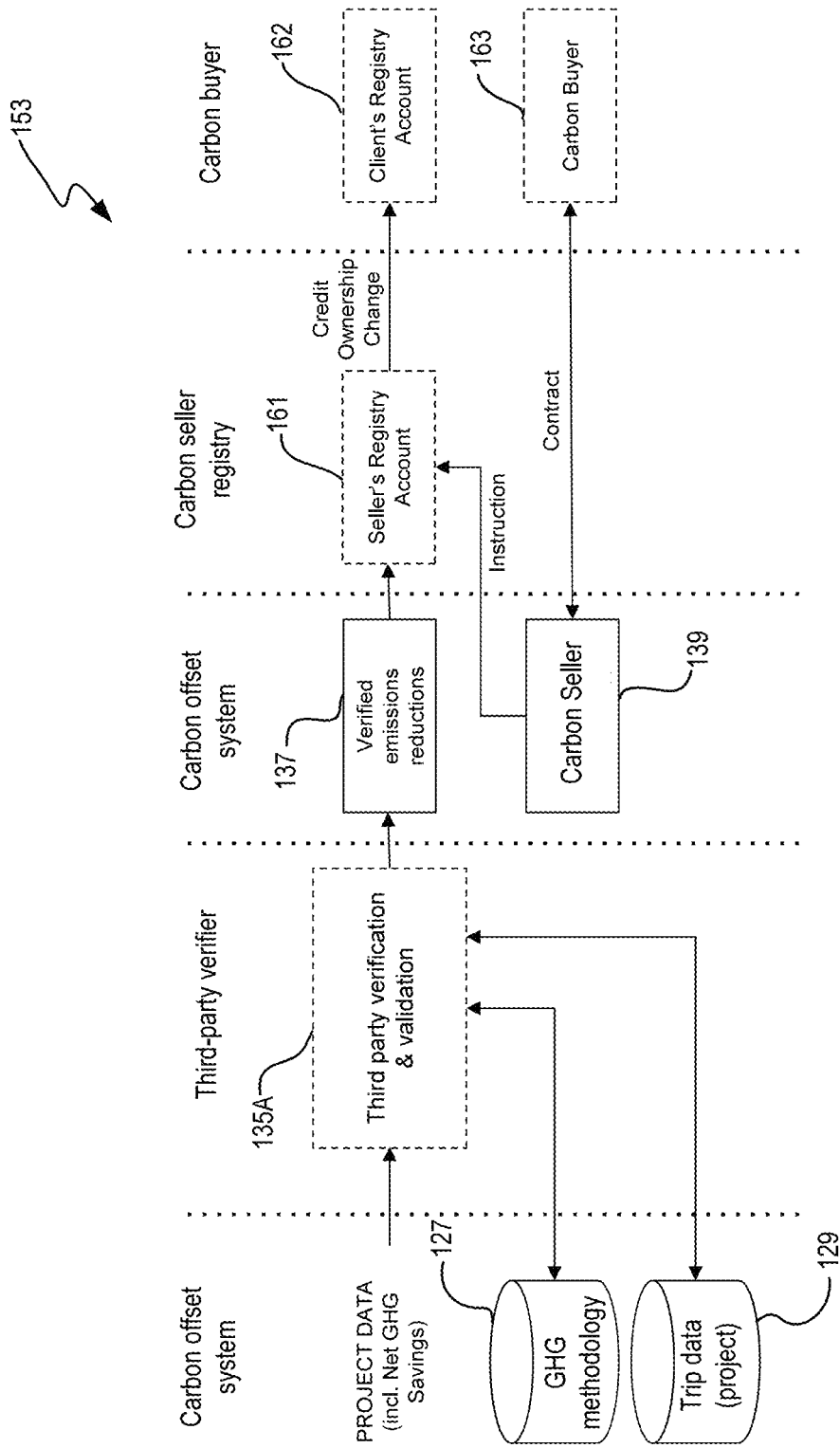
FIG. 15 illustrates a method of validation, verification and exchange of carbon offsets once net GHG emissions savings have been determined by a carbon offset system.

FIG. 15 illustrates a data flowchart for a method 153 of verification and exchange of carbon offsets once net GHG emissions savings have been determined by a carbon offset system. The carbon offset or project data (including net GHG savings) obtained using the methodology 127 for determining the net GHG reductions and the project trip data 129 for a completed user trip are provided to a third party verification system 135A. Verification system 135A validates and verifies the carbon offset data to produce a verification statement to facilitate the issuance of verified emissions reductions 137 (e.g. in the form of offsets or credits). The verified emissions reductions 137 are typically recorded on a registry account 161 that is held by a party 139 looking to transact the carbon offsets (which party can be the project owner/provider of the services through the modal shift application, in the embodiments described herein). When a party 139 selling carbon offsets enters into a contract to transfer the verified emissions reductions 137 to a carbon offset buyer 163, the buyer's registry account 162 (along with the seller's registry account 161) is updated to reflect the transfer.

Figure 16:
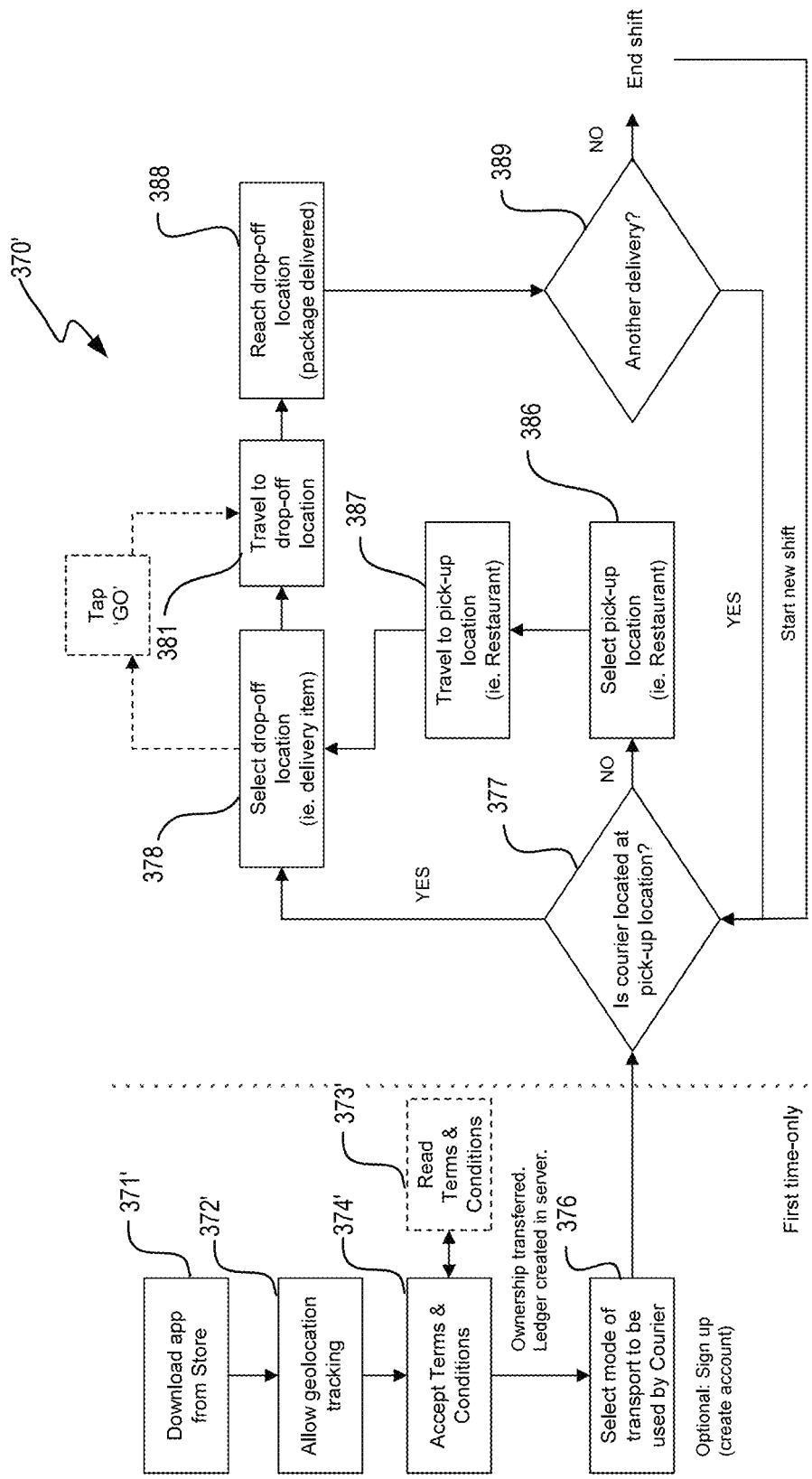
FIG. 16 illustrates a method performed by a courier interacting with a modal shift application installed on the courier's device for the transport of goods.

The methods and systems described herein may be applied to harvesting carbon reductions from the transport of goods or provision of services that require transport. FIG. 16 illustrates an exemplary method 370' that may be performed by a user who is tasked with the transport of goods or provision of services requiring the user to take one or more trips within an urban agglomeration. For example, such activities may include: delivery of a parcel or package to a customer, restaurant or take-out delivery services, or any other service which requires a physical item to be picked up and delivered. Certain steps of method 370' are similar to steps of method 370 shown in FIG. 3 for the transport of a user. Similar reference numerals are used to denote these similar steps, appended with a prime symbol (e.g. step 371 of method 370 in FIG. 3 is similar to step 371' of method 370' of FIG. 16 for downloading the modal shift application). However, steps of method 370' which do not have any equivalent in FIG. 3's method 300 are shown with new reference numerals. The different steps of method 370' are described below. In the description that follows, the "user" in method 370' is also referred to as the courier.

In method 370', after the courier has downloaded and installed the modal shift application onto their user device at block 371', enabled geolocation tracking on their user device at block 372' and reviewed the terms and conditions at block 373' and accepted them at block 374', the courier is invited to select a mode of transport at block 376'. The mode of transport may be alternative to the baseline trip. The baseline trip for delivery of goods may not necessarily be a single-occupancy vehicle trip (e.g. a trip by an average gasoline car) as is generally the case with passenger transport, but may be a delivery van or truck, as used by the majority of delivery companies for urban deliveries in certain embodiments. The baseline is assessed for each geographic region based on the particularities of that region, including delivery statistics. The mode of transport selected by the courier at block 376' may be the courier's bicycle, electric bicycle, PEV, or any other mode of transport that results in less GHG emissions over the equivalent baseline trip. Alternately, the courier may select a standard gasoline car as the mode of transport (which will not result in any net GHG emission savings over the baseline), but can still use the trip planning aspect of the modal shift application.

Once the courier has selected the mode of transport, method 370' proceeds to block 377 at which the modal shift application determines whether the courier is located at the same location as the pick-up location for the item that requires transport. If the courier is located at the pick-up location at block 377, the method 370' proceeds to block 378 at which a drop-off location for the item is displayed and selected. The courier travels to the drop-off location (block 381) and reaches the drop off location to deliver the item (block 388). If another delivery is required (block 389), the method can be repeated starting with the step at block 377. If the courier is tasked with delivering an item that is not located at the courier's current location at block 377, the courier needs to make a first trip to pick up the item, by selecting the pick-up location (e.g. restaurant) at block 386 and using the application to travel to the pick-up location to pick up the item (block 387). Once the courier has the item, method 370 then continues with the courier making a second trip to deliver the item to the customer, starting at block 378.

During the steps of method 370', the courier's project trip data (including trip selection, mode of transport and distance travelled) is tracked and reported to a carbon offset system, similarly to the methods described above for the transport of people. The courier's project trip data can be converted to carbon reductions, using processes similar to those as described herein, by comparing the courier's project trip emissions to the emissions of the equivalent baseline trip, discounted using a discount factor such as the modal ratio.

The methods described herein may be adapted for application to the physical movement of users who need to travel to one or more locations to perform a service, without necessarily transporting a good (e.g. housekeeping, cleaning, walking pets, babysitting, photography, house-sitting, repair or maintenance services, etc.). Urban travel for delivering such services which result in reduced GHG emissions over the baseline trip can be converted to carbon offsets, using similar methods to those described herein for the transport of persons and goods. For example, a user who needs to travel to a site for delivering a service may perform steps 371' through 376 of method 370' of FIG. 16 ending with the selection of a mode of transport at block 376, then subsequently perform steps 375 and the remaining subsequent steps of method 370 of FIG. 3, to determine a route and make the trip to the desired site. The user's project trip data can be converted to carbon reductions, using processes similar to those as described herein, by comparing the user's project trip emissions to the emissions of the equivalent baseline trip, discounted using a discount factor such as the modal ratio.

Figure 17:
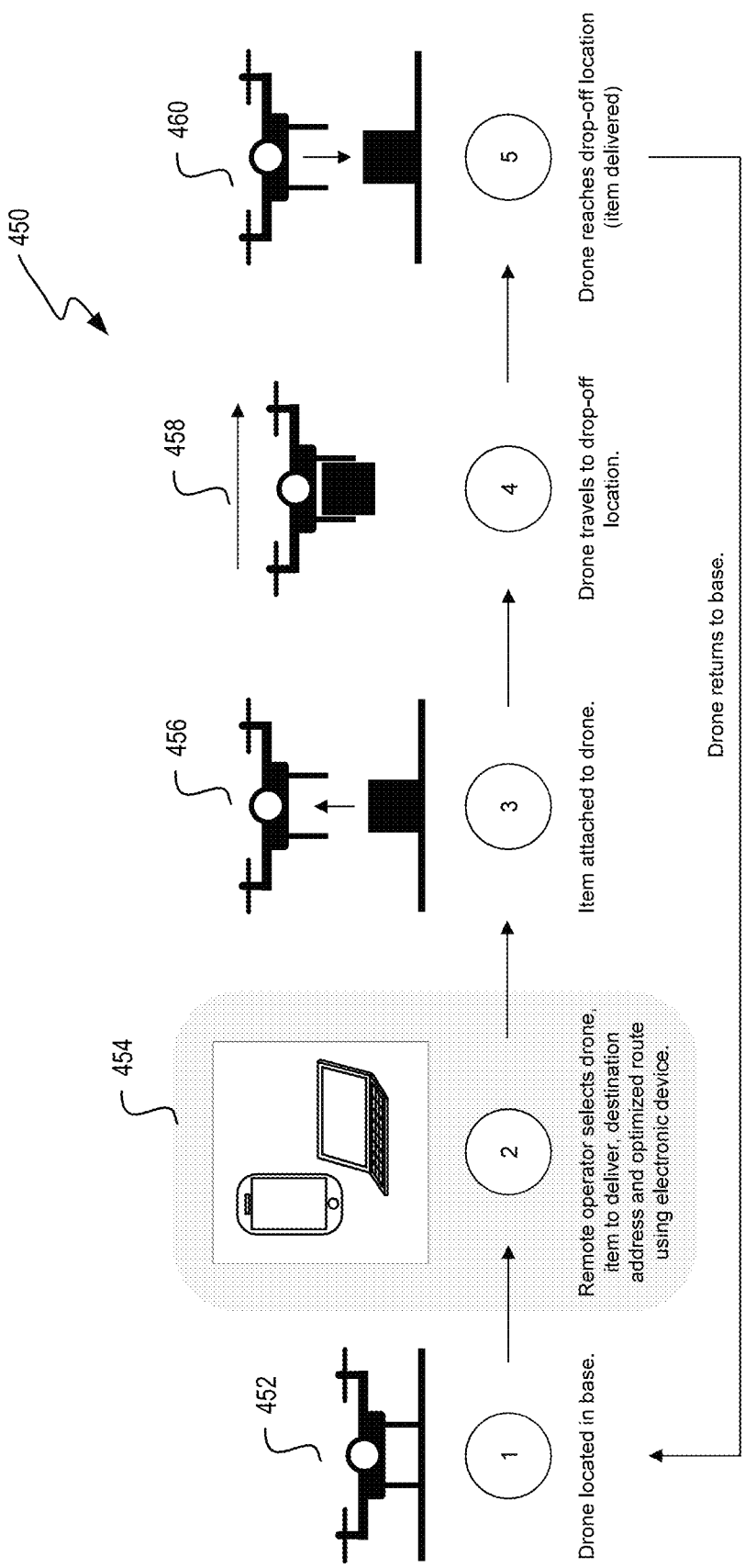
FIG. 17 illustrates a method for transport of goods using remote delivery.

FIG. 17 shows an alternate method 450 of delivery of an item using an unmanned aerial vehicle (UAV), unmanned ground vehicle (UGV) or any other small remote-controlled vehicle that can be used to transport an item (hereinafter "drone"). Method 450 includes the steps of starting with the drone located at the base (block 452); the operator selecting the drone, the item to deliver, the destination address and the optimized route using an electronic device (block 454);

attaching the item to the drone (block 456); operating the drone to travel to the drop-off location (block 458); and releasing the item once the drone has reached the drop-off location (block 460). This method 450 of delivery may be used as the alternative mode of transport that is used to pick-up and/or deliver items in method 370' of FIG. 16. The drone has geolocation tracking capability which enables its movements to be tracked and reported to a carbon offset system, similarly to the methods described above for the transport of people. The drone's project trip data can be converted to carbon reductions, using processes similar to those as described herein, by comparing the drone's project trip emissions to the emissions of the equivalent baseline trip, discounted using a discount factor such as the modal ratio. As noted above, the baseline trip for urban delivery of goods may not be a single-occupancy vehicle trip (e.g. the baseline trip may be a delivery truck), and can be determined based on delivery statistics for each geographic region.

In the transportation sector, a problem with existing technologies is that the potential for capturing carbon reductions from the transport of people or goods by bus, transit rail, ride-share and other alternative transport solutions (including, without limitation, any more efficient use of private vehicles resulting in a reduction of GHG emissions over single-occupancy vehicle trips, such as use of PEVs, park and ride, carpooling in private vehicles, etc.) remains largely untapped, given the technical, financial and other implementation barriers for establishing a carbon offset program, as well as the difficulties in establishing ownership of environmental attributes. Embodiments of the invention described herein provide a solution to this problem by providing a trip planning tool (delivered via a modal shift application installed on a user's device) which not only helps users to locate more efficient, economical and/or environmentally-friendly trip options to travel from point A to point B, but which tracks the door-to-door movements of individual users who are using the modal shift application to plan and complete a trip. Through the processes as described above, the modal shift application provides additionality and establishes ownership over the environmental attributes generated through use of the modal shift application, and interacts with a carbon offset system to convert and transform the physical movements of listed users to verifiable carbon reductions.

In alternate embodiments, the modal shift application functionality as described herein can be implemented in third-party mobility aggregators' applications or on third-party mobility providers' applications for transit agencies, ride-hailing companies, taxi companies, bicycle-share companies, e-scooter share companies, car-share companies, ferry companies, limousine services, shuttle buses, and the like, running on user devices such as smartphones, smartwatches and the like. These applications can interact with an environmental impact server of a carbon offset system to convert physical movements of users to verifiable carbon offsets. Other implementations may incorporate personal fitness or activity trackers (e.g. a watch that monitors your movements) that are capable of providing the functionality of the modal shift application including having a suitable screen for providing the user interface functionality.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. For example:

- While the examples described above generally include various modes of transport over land or water, in alternate embodiments the transport of users or goods may involve transport that extends over air. As such, the systems and methods described herein can be adapted to include various modes of air travel, such as airplanes, helicopters, drones, and the like, to travel to the user's destination or deliver an item.
- While the systems and methods described herein assume that the project trip starts in or takes place entirely within a project boundary, in other embodiments the trip may cross other project boundaries (e.g. for travel into other urban agglomerations in another geographic region). The systems and methods described herein may be adapted for use in trip planning for transport of people and/or goods and modal shift for trips which cross project boundaries and for the determination and aggregation of the resulting emissions savings from such trips. Emissions calculations may be based on the emissions factors in one of the geographic regions, such as the geographic region containing the start point or end point for the trip, or they may be based on an average of or combination of the emissions factors across the geographic regions over which the travel takes place. A weighted combination of the emissions factors may be used in some embodiments.
- Project GHG emissions can be calculated using other methods than as described above, such as by developing a life-cycle assessment (LCA) or alternatives of each transport mode available, instead of emissions factors for operation; and/or by obtaining real-time access to vehicle emissions based on performance.
- Baseline GHG emissions can be calculated using other methods than as described above, such as by determining a baseline emissions based on statistical data of a set of users over a period of time, creating stratified baselines based on a set of characteristics of individuals that live and work in a particular area and belong to a certain demographic, including the complete LCA of the single-occupancy vehicle for the baseline calculation rather than only the emission factors during operation, conducting user surveys to obtain data (e.g. to indicate ownership of a vehicle and access the location of the vehicle owned by the user) to help describe the users' movement patterns and other relevant data in order to establish the baseline, obtaining real-time access to vehicle fleets' emissions, or any combination of the above solutions.
- Project GHG emissions for the use of PEVs as an alternate mode of transport could be established through a user indicating ownership of a PEV (e.g. through a survey, application embedded into the infotainment system of the PEV itself, through statistics data, etc.) and the user selecting the PEV option for calculating a route to the destination. The carbon offset system would then determine the emissions based on the applicable PEV emissions factor and the distance travelled using the PEV.
- The methods and systems described herein may be applied to quantifying the carbon savings from the use of technology or systems in vehicles that reduce GHG emissions, such as "auto-stop" features or eco-efficient routes proposed by GPS systems, and trips taken by vehicles such as PEVs which have a lower carbon impact that the SOBT.

The scope of the claims should not be limited by the illustrative embodiments set forth in the examples, but should be given the broadest interpretation consistent with the description as a whole.

The invention claimed is:

1. A computer-implemented method for generating greenhouse gas emissions (GHG) savings data from data obtained from geolocation services activated on a user device for conversion to verifiable environmental attributes, comprising:
   (a) providing a modal shift application to the user device, the modal shift application activating the geolocation services of the user device and displaying a graphical user interface (GUI) enabling a user to specify a destination, the GUI having a trip results area for displaying a plurality of transport options to the destination from a current location wherein each of the transport options comprises one or more modes of transport, a map area for displaying a selected one of the plurality of transport options, and a summary bar for displaying a summary of modes of transport for the selected transport option;
   (b) receiving from the user device an input provided through the GUI of the modal shift application, the input specifying the destination, and determining the plurality of transport options to the destination from the current location of the user device, the current location defining a start point for a trip, and communicating the plurality of transport options to the user device for display in the GUI of the modal shift application;
   (c) monitoring movements of the user as the user completes the trip by travelling to the destination, wherein monitoring the movements comprises receiving from the user device geolocation information obtained from geolocation services activated on the user device by the modal shift application, the geolocation information tracking a distance travelled for each mode of transport taken by the user;
   (d) obtaining project GHG emissions data for the trip, by performing calculations based at least in part on emissions factors associated with each mode of transport and the distance travelled for each mode of transport;
   (e) obtaining baseline GHG emissions data for a baseline transport option to the destination, by performing calculations based at least in part on a distance of a baseline trip between the start point and the destination, the emissions factors for the baseline trip, and a discount factor indicative of the likelihood of adoption of the baseline transport option;
   (f) obtaining GHG emissions savings data by determining a difference between the baseline GHG emissions data and the project GHG emissions data;
   (g) communicating the GHG emissions savings data to a system for aggregation with GHG emissions savings data from other trips, and delivering the aggregated GHG emissions savings data to an independent system for validation and verification; and
   (h) communicating the GHG emissions savings data to the user device, wherein the modal shift application on the user device processes the GHG emissions savings data to display in the GUI of the modal shift application a comparison of carbon emissions for the trip to the baseline transport option.

2. The method of claim 1 wherein the project GHG emissions data is calculated based on server emissions produced by energy consumption of one or more servers used for determining the plurality of transport options and monitoring the movements of the user for the trip.

3. The method of claim 1 comprising converting the aggregated GHG emissions savings into the environmental attributes using a recognized conversion methodology.

4. The method of claim 3 wherein the environmental attributes comprises one or more of carbon units, carbon offsets and carbon credits.

5. The method of claim 1 wherein the discount factor is specific to a geographic region containing the start point.

6. The method of claim 2 wherein the project GHG emissions data for the trip is calculated by summing emissions from a plurality of segments of the trip in accordance with the following:

$$PE_{tr} = \left(\sum_{i=1}^{n} (TRIP_{pkm_i} * EF_{modeT_i})\right) + EA_{ectSU}$$

where:
  $PE_{tr}$ is the project GHG emissions for the trip;
  n is a total number of the plurality of segments, each of which is taken in a particular mode of transport;
  $EF_{modeT}$ is an emission factor specific to the mode of transport for a geographic region for the trip;
  $TRIP_{pkm}$ is the passenger kilometers for the mode of transport for each segment; and
  $EA_{ectSU}$ is the server emissions.

7. The method of claim 6 wherein the discount factor comprises a modal ratio, and wherein the baseline GHG emissions data for the trip is calculated by applying the emissions factors for the baseline trip and the modal ratio in accordance with the following:

$$BE_{tr} = SOBT_{pkm} * EF_{modeT} * MoR_{SOV}$$

where:
  $BE_{tr}$ is the baseline GHG emissions for the trip;
  $SOBT_{pkm}$ is a single-occupancy baseline trip distance;
  $EF_{modeT}$ is the emission factor specific to the mode of transport for the geographic region; and
  $MoR_{SOV}$ is the modal ratio for single-occupancy vehicles for the geographic region.

8. The method of claim 5 wherein the GHG emissions savings data is determined by subtracting leakage from the difference between the baseline GHG emissions data and the project GHG emissions data, wherein the leakage accounts for a tendency for the user to take the trip outside the geographic region.

9. The method of claim 1 wherein determining the plurality of transport options comprises, for at least a portion of the trip, selecting from modes of transport having reduced GHG emissions over the baseline transport option.

10. The method of claim 1 wherein the user is tasked with transporting a good from a predefined location to a location of a customer and wherein steps (a) to (e) of claim 1 are performed for a first trip taken by the user to pick up the good from the predefined location and for a second trip taken by the user to deliver the good from the predefined location to the location of the customer.

11. A system for generating greenhouse gas emissions savings data from data obtained from geolocation services activated on a user device for conversion to verifiable environmental attributes, comprising an environmental impact server configured to:
   (a) provide a modal shift application to the user device, the modal shift application activating the geolocation services of the user device and displaying a graphical user interface (GUI) enabling a user to specify a destination, the GUI having a trip results area for displaying a plurality of transport options to the destination from a current location wherein each of the transport options comprises one or more modes of transport, a map area for displaying a selected one of the plurality of transport options, and a summary bar for displaying a summary of modes of transport for the selected transport option;

(b) receive from the user device an input provided through the GUI of the modal shift application, the input specifying the destination, and determine the plurality of transport options to the destination from the current location of the user device, the current location defining a start point for a trip, and communicate the plurality of transport options to the user device for display in the GUI of the modal shift application, (c) monitor movements of the user as the user completes the trip by travelling to the destination, wherein monitoring the movements comprises receiving from the user device geolocation information obtained from geolocation services activated on the user device by the modal shift application, the geolocation information tracking a distance travelled for each mode of transport taken by the user;

(d) obtain project GHG emissions data for the trip, by performing calculations based at least in part on emissions factors associated with each mode of transport and the distance travelled for each mode of transport;

(e) obtain baseline GHG emissions data for a baseline transport option to the destination, by performing calculations based at least in part on a distance of a baseline trip between the start point and the destination, the emissions factors for the baseline trip, and a discount factor indicative of the likelihood of adoption of the baseline transport option;

(f) obtain GHG emissions savings data by determining a difference between the baseline GHG emissions and the project GHG emissions;

(g) communicate the GHG emissions savings data to a system for aggregation with GHG emissions savings data from other trips, and deliver the aggregated GHG emissions savings data to an independent system for validation and verification; and (h) communicate the GHG emissions savings data to the user device, wherein the modal shift application on the user device processes the GHG emissions savings data to display in the GUI of the modal shift application a comparison of carbon emissions for the trip to the baseline transport option.

12. The system of claim 11 wherein the environmental impact server is configured to obtain project GHG emissions data for the trip by performing calculations based at least in part on server emissions produced by energy consumption of one or more servers used for determining the plurality of transport options and monitoring the movements of the user for the trip.

13. The system of claim 11 wherein the environmental impact server is configured to convert the aggregated GHG emissions savings data into the environmental attributes using a recognized conversion methodology.

14. The system of claim 13 wherein the environmental attributes comprises one or more of carbon units, carbon offsets and carbon credits.

15. The system of claim 11 wherein the discount factor is specific to a geographic region containing the start point.

16. The system of claim 12 wherein the environmental impact server is configured to obtain project GHG emissions data for the trip by summing emissions from a plurality of segments of the trip in accordance with the following:

$$PE_{tr} = \left( \sum_{i=1}^{n} (TRIP_{pkm_i} * EF_{modeT_i}) \right) + EA_{ectSU}$$

where:
$PE_{tr}$ is the project GHG emissions for the trip;
n is a total number of the plurality of segments, each of which is taken in a particular mode of transport;
$EF_{modeT}$ is an emission factor specific to the mode of transport for a geographic region for the trip;
$TRIP_{pkm}$ is the passenger kilometers for the mode of transport for each segment; and
$EA_{ectSU}$ is the server emissions.

17. The system of claim 16 wherein the discount factor comprises a modal ratio, and wherein the environmental impact server is configured to obtain baseline GHG emissions data for the trip by applying the emissions factors for the baseline trip and the modal ratio in accordance with the following:

$$BE_{tr} = SOBT_{pkm} * EF_{modeT} * MoR_{SOV}$$

where:
$BE_{tr}$ is the baseline GHG emissions for the trip;
$SOBT_{pkm}$ is a single-occupancy baseline trip distance;
$EF_{modeT}$ is the emission factor specific to the mode of transport for the geographic region; and
$MoR_{SOV}$ is the modal ratio for single-occupancy vehicles for the geographic region.

18. The system of claim 15 wherein the environmental impact server is configured to obtain the GHG emissions savings data by subtracting leakage from the difference between the baseline GHG emissions data and the project GHG emissions data, wherein the leakage accounts for a tendency for the user to take the trip outside the geographic region.

19. The system of claim 11 wherein the environmental impact server is configured to determine the plurality of transport options by, for at least a portion of the trip, selecting from modes of transport having reduced GHG emissions over the baseline transport option.

20. The system of claim 11 wherein the user is tasked with transporting a good from a predefined location to a location of a customer and wherein the environmental impact server is configured to perform steps (a) to (e) of claim 11 for a first trip taken by the user to pick up the good from the predefined location and for a second trip taken by the user to deliver the good from the predefined location to the location of the customer.

21. A computer-implemented method for generating greenhouse gas emissions (GHG) savings data from data obtained from geolocation services activated on a remote-controlled delivery drone for conversion to verifiable environmental attributes, comprising:

(a) providing a modal shift application to a user device, the modal shift application displaying a graphical user interface (GUI) enabling a user to specify a destination for the drone, the GUI having a trip results area for displaying a transport route to the destination from a current location of the drone;

(b) receiving from the user device an input provided through the GUI of the modal shift application, the input specifying the destination, and determining the transport route for a trip by the drone to the destination from the current location of the drone, the current location defining a start point for the trip, and communicating the transport route to the user device for display in the GUI of the modal shift application;

(c) monitoring movements of the drone as the drone completes the trip by travelling to the destination, wherein monitoring the movements comprises receiving from the drone geolocation information obtained from geolocation services activated on the drone, the geolocation information tracking a distance travelled by the drone;

(d) obtaining project GHG emissions data for the trip, by performing calculations based at least in part on emissions factors associated with operating the drone;

(e) obtaining baseline GHG emissions data for a baseline transport option to the destination, by performing calculations based at least in part on a distance of a baseline trip between the start point and the destination, the emissions factor for the baseline trip, and a discount factor indicative of the likelihood of adoption of the baseline transport option; and (f) obtaining GHG emissions savings data by determining a difference between the baseline GHG emissions data and the project GHG emissions data;

(g) communicating the GHG emissions savings data to a system for aggregation with GHG emissions savings data from other trips, and delivering the aggregated GHG emissions savings data to an independent system for validation and verification; and (h) communicating the GHG emissions savings data to the user device, wherein the modal shift application on the user device processes the GHG emissions savings data to display in the GUI of the modal shift application a comparison of carbon emissions for the trip to the baseline transport option.

* * * * *